United States Patent [19]

Pawelski

[11] Patent Number: 5,430,716
[45] Date of Patent: Jul. 4, 1995

[54] PATH HUNT FOR EFFICIENT BROADCAST AND MULTICAST CONNECTIONS IN MULTI-STAGE SWITCHING FABRICS

[75] Inventor: Robert L. Pawelski, Lisle, Ill.

[73] Assignee: AT&T Corp., Murray Hill, N.J.

[21] Appl. No.: 4,820

[22] Filed: Jan. 15, 1993

[51] Int. Cl.$^6$ ............................................. H04Q 11/04
[52] U.S. Cl. ..................................... 370/58.1; 370/54; 370/58.2
[58] Field of Search ........................ 370/58.1, 54, 95.1, 370/80, 62, 58.2, 95.3; 340/825.8

[56] References Cited

U.S. PATENT DOCUMENTS

| | | | |
|---|---|---|---|
| 3,956,593 | 10/1974 | Collins et al. | 179/15 AQ |
| 4,298,977 | 9/1979 | Abbott et al. | 370/62 |
| 4,354,062 | 10/1982 | Mussman | 370/58.2 |
| 4,521,880 | 6/1985 | Orsic | 370/58.1 |
| 4,912,703 | 3/1990 | Sumida | 370/58.2 |
| 4,984,264 | 1/1991 | Katsube | 370/54 |
| 4,991,168 | 2/1991 | Richards | 370/54 |
| 5,103,444 | 4/1992 | Lebizay et al. | 370/54 |
| 5,072,217 | 12/1991 | Georgiou et al. | 370/58.1 |
| 5,103,444 | 4/1990 | Leung et al. | 370/60 |
| 5,115,425 | 5/1992 | Ardon | 370/54 |
| 5,119,366 | 6/1992 | Ardon et al. | 370/54 |
| 5,136,581 | 8/1992 | Muehrcke | 370/58.1 |
| 5,263,121 | 11/1993 | Melsa et al. | 370/54 |

FOREIGN PATENT DOCUMENTS

| | | | |
|---|---|---|---|
| 0266530 | 5/1988 | European Pat. Off. | H04Q 11/04 |
| WO92/10898 | 6/1992 | WIPO | H04l 12/56 |
| 9214319 | 8/1992 | WIPO | H04l 12/56 |
| WO92/17990 | 10/1992 | WIPO | H04Q 11/04 |

OTHER PUBLICATIONS

*Enchanced Network*, Product/Service Information, Northern Telecom pub. No. 50041.16/04-91, Issue 1,(4-91).

M. S. Walker "Multistage Distribution Switching Systems: Clos and Beyond", *SMPTE Journal*, (12-91), pp. 946-954.

K. Sezaki, et al., *A New ATM Switching Network Which is Robust for Multicast*, The Transactions of the Institute of Electronics, Information and Communications Engineers, Sep. 1991, Vol. 74, No. 9, pp. 2779-2784.

*Primary Examiner*—Douglas W. Olms
*Assistant Examiner*—Shick Hom
*Attorney, Agent, or Firm*—David Volejnicek

[57] ABSTRACT

To efficiently implement the algorithm for branching each broadcast call as close to the output of a multi-stage switching fabric as possible, the path hunt for a call path is performed by examining the actual contents of control memories that control the switching stages of the switching system, in order to determine whether—and if so, where—the desired call path may be branched from an existing call path inside of the switching system. For efficiency and speed, the examination is performed by monitoring control memory contents being read out for the purpose of controlling the switching stages, and contents of control memories of multiple stages are monitored in parallel using dedicated monitoring hardware. To avoid the need to examine the control memories' contents in order to determine how much of a call path can be torn down without breaking call path segments shared with other existing call paths, separate counts are kept of instances of present use of connections between stages of the switching fabric, which counts are incremented upon creation of any branching paths that use these connections and are decremented upon breaking of any branching paths that use these connections.

87 Claims, 12 Drawing Sheets

P-GRAPH

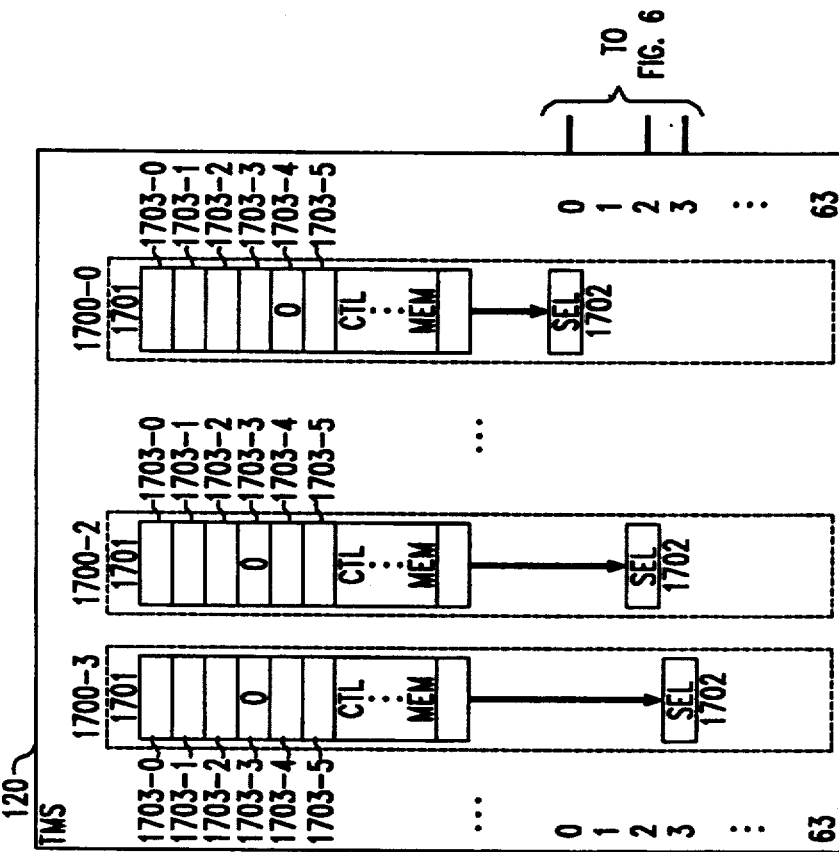
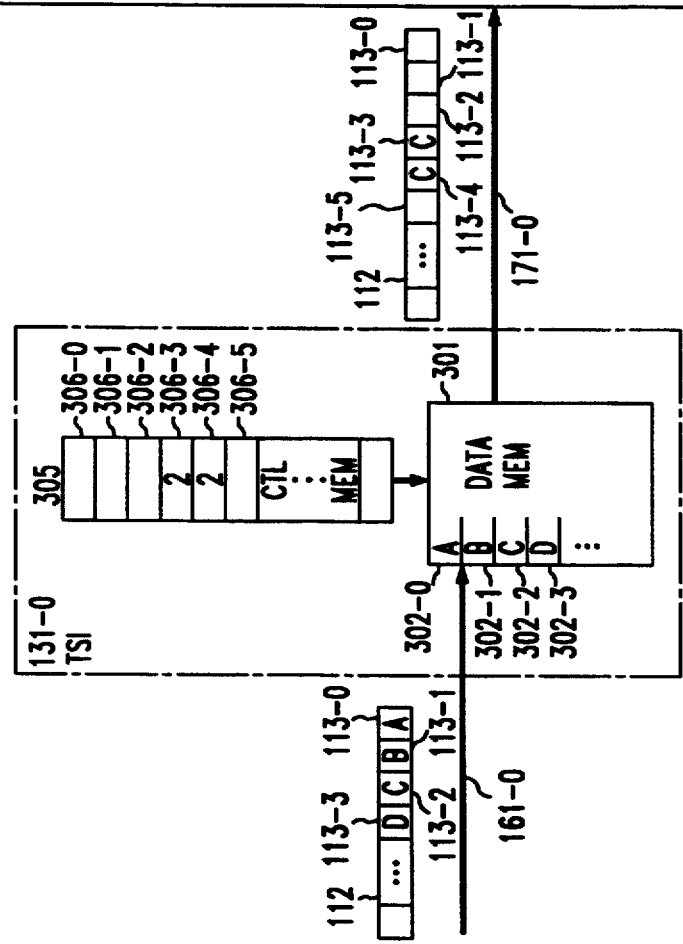
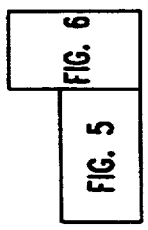

FIG. 10

800-0 TABLE OF INTERNAL TIME-SLOT NUMBERS OF OUTPUT TSI 141-0

| 801-0 | USE COUNT |
| --- | --- |
| | . |
| | . |
| | . |
| | . |
| 801-M | USE COUNT |

800-63 TABLE OF INTERNAL TIME-SLOT NUMBERS OF OUTPUT TSI 141-63

| 801-0 | |
| --- | --- |
| | . |
| | . |
| | . |
| | . |
| 801-M | |

900-0 TABLE OF INTERNAL TIME-SLOT NUMBERS OF INPUT TSI 131-0

| 901-0 | USE COUNT |
| --- | --- |
| | . |
| | . |
| | . |
| | . |
| 901-M | USE COUNT |

900-63 TABLE OF INTERNAL TIME-SLOT NUMBERS OF INPUT TSI 131-63

| 901-0 | |
| --- | --- |
| | . |
| | . |
| | . |
| | . |
| 901-M | |

. . .

5,430,716

PATH HUNT FOR EFFICIENT BROADCAST AND MULTICAST CONNECTIONS IN MULTI-STAGE SWITCHING FABRICS

TECHNICAL FIELD

This invention generally relates to telecommunications, and specifically relates to multi-stage switching arrangements.

BACKGROUND OF THE INVENTION

Due to the rapid deployment of the Synchronous Optical Network (SONET) and the similar Synchronous Digital Hierarchy (SDH) standards for broadband transmissions, switching systems of the future are likely to have greater capacity and a wider variety of service types integrated together. These new services are envisioned to include more extensive video conferencing than is presently deployed, due to advances in video compression based on the P×64 standard (where P is an integer). This standard is based on the Discrete Cosine Transform (DCT), which allows varying levels of quality based on multiples of 64 kb/s. Business video conferencing will place a burden on new switching systems to have broadcast capability. However, the same DCT algorithms are being developed for still-image transfer (known as the JPEG standard) and full-motion broadcast video (known as the MPEG standard). Several manufacturers are developing chip sets based on these standards, which are envisioned to eventually be deployed in most television sets, personal computers, and workstations. The resulting explosion in the consumer markets along with the business markets will place heavy demands on switching systems of the future to be able to handle not only variable bandwidth (bandwidth on demand), but also extensive broadcast trees.

Because transmissions will be based on multiples of 64 kb/s as part of the hierarchical nature of the SONET and SDS formats, time-division switching fabrics will lend themselves well to this task. However, in multi-stage fabrics, the extent to which this format can be exploited depends on the ability of the switch-control mechanism to be able to hunt paths rapidly. For example if the fabric is carrying broadcast video, call-hold times may be very short due to customers browsing through the available channels. Another scenario requires rapid setup and tear down of broadcast trees in a video conference in order to follow changes in whoever is the active speaker. The demands made on software-based path hunting may be overwhelming.

Another consideration implicates the non-blocking performance of the switching fabric. A switching-fabric architecture that is guaranteed to be non-blocking in the strict sense for point-to-point connections is not necessarily non-blocking when the mix of switched traffic includes broadcast (including multicast) connections, and the probability of blocking generally increases with the number and the fanout of the broadcast connections.

One promising algorithm involves branching each broadcast call as close to the output of the switching fabric as possible. This results in the use of fewer resources at the input side of the fabric, thus making them available for new calls. Interestingly, the conservation of resources resulting from this broadcasting algorithm actually decreases the probability that a new call will be blocked; as a consequence, the network performance is better, on average, when broadcasting is occurring. Unfortunately, the complexity of implementing this algorithm by means of conventional path-hunting techniques is likely to result in a cumbersome path-hunt arrangement that is too slow to meet the rapid path setup and tear down requirements that were discussed above.

SUMMARY OF THE INVENTION

This invention is directed to solving these and other problems and disadvantages of the prior art. Generally according to the invention, the path hunt for a call path is performed by examining the actual contents of control memories that control the switching stages of a switching system, in order to determine whether—and if so, where—the desired call path may be branched from an existing call path inside of the switching system.

According to a first aspect of the invention, in a switching system that has a plurality of switching stages including an input stage with a plurality of inputs and an output stage with a plurality of outputs and wherein each stage is controlled by at least one control memory, a request to connect a first input to a second output is responded to by examining contents of at least one control memory of at least one of the switching stages to determine whether the first input is already connected to the output stage. If so, contents of merely a control memory of the output stage are modified in order to connect the first input to the second output. Furthermore, either in response to the request, or in response to a determination that the first input is not already connected to the output stage—control memory contents examinations may be performed serially or in parallel—contents of at least one control memory of at least one of the switching stages are examined to determine whether the first input can be connected to the output stage. If so, contents of a control memory of at least one of the switching stages are modified to connect the first input to the output stage, and contents of a control memory of the output stage are modified to connect the first input to the second output. By working with the actual switching control memories and their contents, the arrangement implements the algorithm for branching each broadcast call as close to the output of the switching fabric as possible by using facilities that are already present in the switching system. The duplication of these facilities is thereby avoided. More importantly for rapid path-hunt considerations, however, the delay involved in updating any duplicate facilities with the changing contents of the actual switching control memories is avoided. Preferably, the control memory contents are examined by way of being monitored as they are being read out for the purpose of controlling their corresponding switching stages. Any interference with or delay in the control memories' primary function is avoided thereby. And if contents of various ones of the control memories are examined in parallel, the determination of whether, and where, a desired call path can be branched from an existing call path, can be made within a single read cycle through the control memories, yielding a rapid path hunt.

According to a second aspect of the invention, the monitoring of multiple control memories' contents is performed in parallel in dedicated hardware. In a switching system having a plurality of switching stages including an input stage with a plurality of inputs and an output stage with a plurality of outputs and wherein each stage is controlled by at least one control memory, first and second apparatuses respond to a request to connect a first input to a second output, each by monitoring control words being read out of a control memory of one stage for the purpose of controlling the one stage, in parallel with the other apparatus monitoring control words being read out of a control memory of a different stage for the purpose of controlling the different stage. On the basis of the monitoring done by the two monitoring apparatuses, a third arrangement then determines whether the first input can be connected to the second output by means of a branch of an existing connection, or whether it must be connected via a totally-new connection.

The branching of broadcast calls from a common source-point within the switching system implies sharing of at least a portion of the call path between these calls. Care must therefore be taken in tearing down a call's path to ensure that any portion of that call path being used by another call is maintained. Thus, the path tear-down activities involve some of the same considerations, and hence face some of the same constraints as, the path setup activities, including stringent requirements on speed. Therefore, according to a third aspect of the invention, in order to eliminate the need to re-examine control memory contents during the path tear-down procedure and thereby speed up the path tear-down procedure, separate records are kept of instances of present use of connections between stages of the switching system. In a switching system having a plurality of switching stages including an input stage with a plurality of inputs and an output stage with a plurality of outputs, a request to connect a first input to a second output is responded to by determining whether the first input is already connected to the output stage. If the first input is already connected to the output stage, it becomes connected to the second output at the output stage, and a count that represents instances of present use of the connection to the output stage is updated to reflect the newly-made connection. If the first input is not already connected to the output stage, a determination is made of whether the first input can be connected to the output stage. If the first input can be so connected, the connection is made, the first input becomes connected to the second output at the output stage, and the count is updated to reflect this connection. Then, in response to a request to disconnect the first input from the second output, disconnection of the first input from the second output is made at the output stage, and the count is updated to reflect the disconnection. If the newly-updated count still represents at least one instance of present use of the connection to the output stage, the remainder of the connection is maintained. But if the newly-updated count represents no instances of present use of the connection to the output stage, the connection of the first input to the output stage is broken. Preferably, in a switching network having three or more stages, separate such counts are maintained for connections between every pair of adjacent stages, and are used in a corresponding way as the count characterized above. The determination of how much of the path is to be torn down is therefore made without a need to examine the contents of the switching system's control memories.

These and other advantages and features of the invention will become apparent from the following description of an illustrative embodiment of the invention taken together with the drawing.

BRIEF DESCRIPTION OF THE DRAWING

FIGS. 5 and 6 are block diagrams of control memories of TSIs and the TMS of the system of FIG. 1 with contents corresponding to the P-graph of FIG. 4;

FIG. 7 shows the arrangement of FIGS. 5 and 6 to form a complete Figure.

FIGS. 10 and 11 are block diagrams of tables of internal time slot numbers of output TSIs and input TSIs, respectively, of the system of FIG. 1, which are used in a second embodiment of the path hunt/path setup and path tear-down functions;

DETAILED DESCRIPTION

Figure 1:
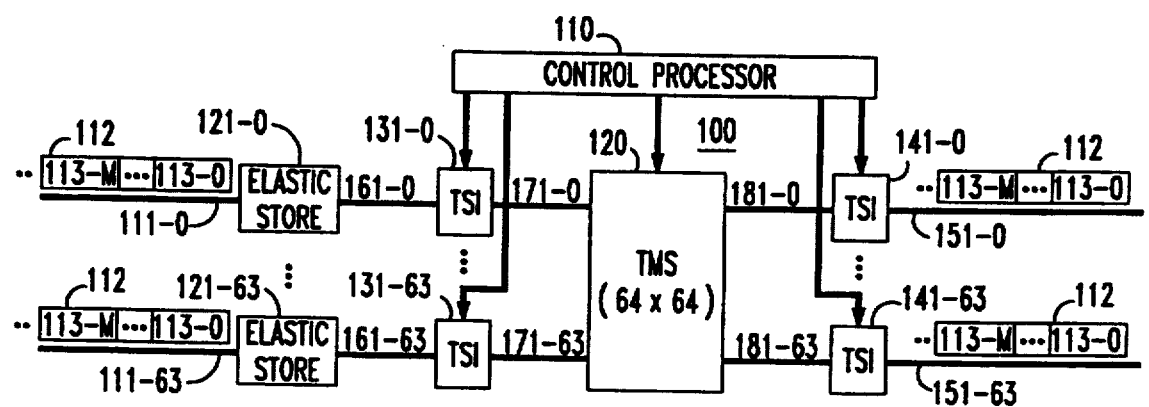
FIG. 1 is a block diagram of a time-division multiplex circuit-switching system that incorporates an illustrative embodiment of the invention.

FIG. 1 is a block diagram of an exemplary switching system 100 in accordance with the invention. System 100 is of the time-space-time (T-S-T) type with 64 input time-slot interchangers (TSIs) 131 connected to system input links 111 through elastic stores 121 and their output links 161, a central 64×64 time-multiplexed switch (TMS) 120 connected to output links 171 of TSIs 131, and 64 output time-slot interchangers 141 connected to TMS output links 181 and to system output links 151. Input TSIs 131 each receive time slots 113 of frames 112 incoming on their respective input links 161 after they are aligned by elastic stores 121. A central control processor 110 controls system 100 and, in particular, performs path hunts through the system and controls the various switching elements (TSIs, TMS) in accordance with the path-hunt results.

It is well-known in the art that, in an N×N switching fabric, 2N paths are needed through the switch in order to obtain strictly-non-blocking performance. It is also well-known to obtain the 2N paths through a T-S-T switch by duplicating the T-S-T stages and operating the two duplicate fabrics in parallel. This duplication is assumed but not shown in FIG. 1 in order to avoid undue complexity of the illustration.

Figure 2:
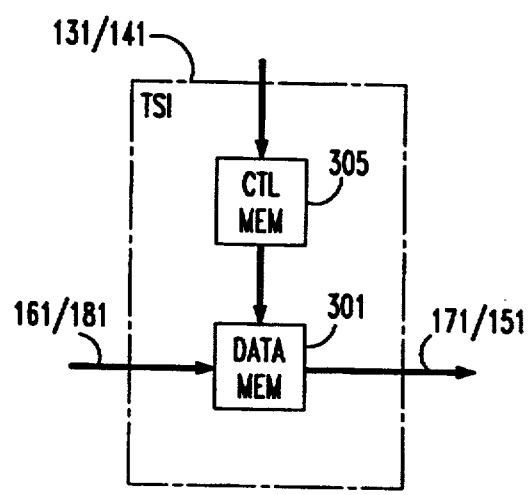
FIG. 2 is a block diagram of an illustrative embodiment of a time-slot interchanger (TSI) of the system of FIG. 1.

An illustrative embodiment of a TSI 131 or 141 is shown in FIG. 2. As is conventional, a TSI 131 or 141 comprises a pair of memories: a control memory (CTL MEM) 305 and a data memory (DATA MEM) 301. Typically, memory 301 is double buffered, comprising two buffers one of which is written while the other is read and the two of which alternate in time between being read and written. Each buffer of data memory 301 is sized to store a full flame 112 of time slots 113-0 through 113-M. Data memory 301 has its data input connected to its TSI's input link 161 or 181 to receive incoming frames 112, and has its data output connected to its TSI's output link 171 or 151 to transmit outgoing flames 112. Data memory 301 operates under control of control memory 305. Either time slots 113 of incoming frames 112 are stored in sequential locations of data memory 301 and are read out in an order dictated by control memory 305, or time slots 113 of incoming frames 112 are stored in data memory 301 in an order dictated by control memory 305 and locations of data memory 301 are read sequentially. The former is assumed in the discussion that follows.

The contents of control memory 305 represent the input-time-slot to output-time-slot assignment that is to be effected by a TSI 131 or 141 for each incoming and outgoing frame 112. Control memory 305 is one frame deep, i.e., it has a storage location for each time slot 113 of a frame 112. For the purpose of controlling data memory 301, the storage locations of memory 305 are read sequentially.

Illustratively, TSIs 13 1 and 141 may be configured as disclosed in U.S. application of R. L. Pawelski entitled "Multirate, Sonet-Ready, Switching Arrangement", Ser. No. 07/964,537, filed on Oct. 20, 1992, now issued as U.S. Pat. No. 5,323,390.

Figure 3:
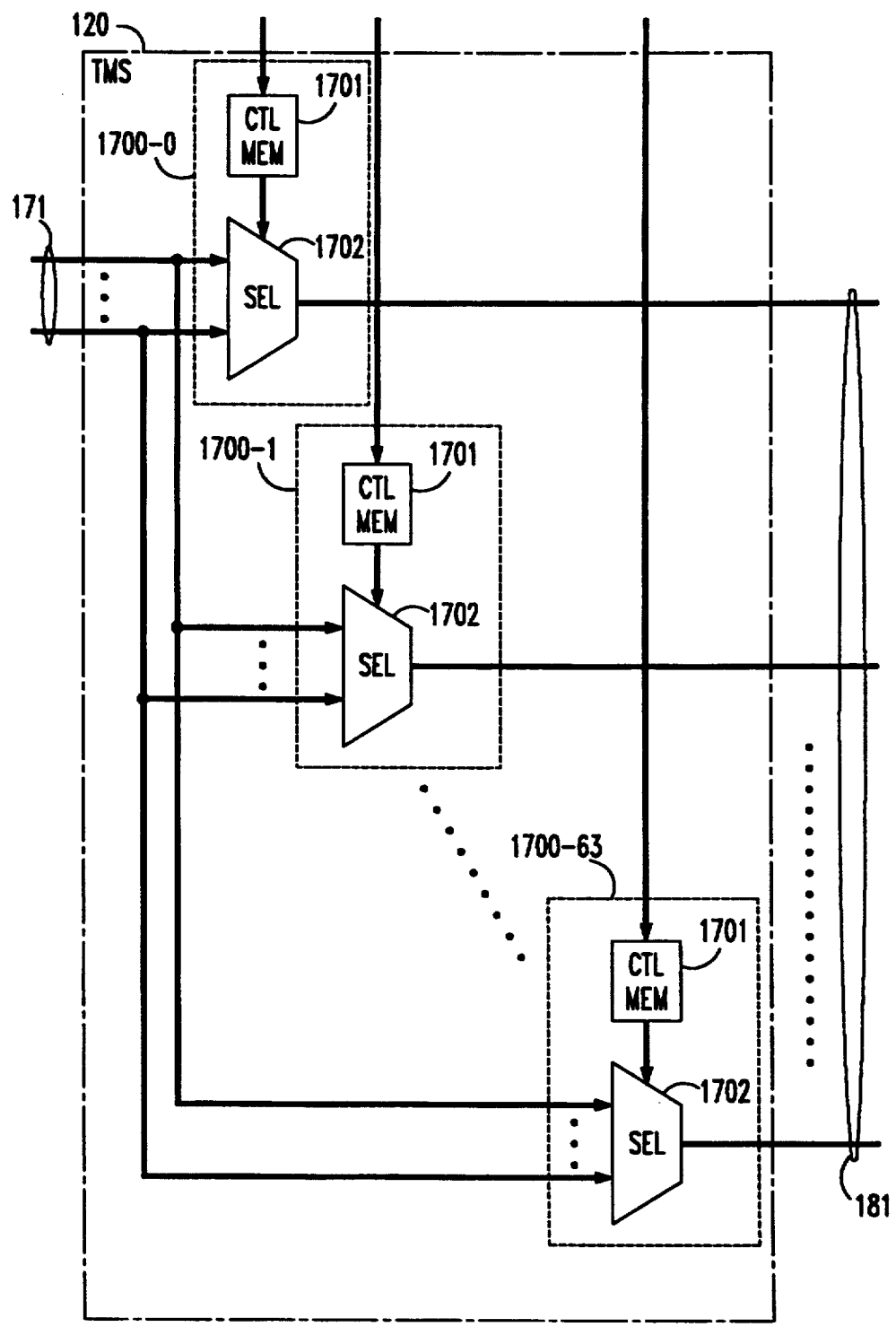
FIG. 3 is a block diagram of an illustrative embodiment of the time-multiplexed switch (TMS) of the system of FIG. 1.

FIG. 3 shows an illustrative embodiment of TMS 120. It comprises a plurality of output controls 1700, one for each TMS output link 181. Each output control 1700 comprises a selector (SEL) 1702 and an associated control memory (CTL MEM) 1701. Connected to the inputs of each selector 1702 are all of the TMS input links 171. Each selector 1702 operates under control of its own control memory 1701. During each time-slot interval of a frame 112, control memory 1701 of each selector 1702 selects one of the input links 171 connected to the corresponding selector 1702 for connection to its output link 181. Hence, the contents of a control memory 1701 represent the input-port to output-port assignment that is to be effected by its selector 1700 during time slots 113 of each frame 112. Control memory 1701 is one frame deep, i.e., it has a storage location for each time slot 113 of a frame 112. For the purpose of controlling selector 1702, the storage locations of memory 1701 are read sequentially.

Illustratively selectors 1700 may be configured as also disclosed in the U.S. application Ser. No. 07/964,537 referred to above.

Figure 4:
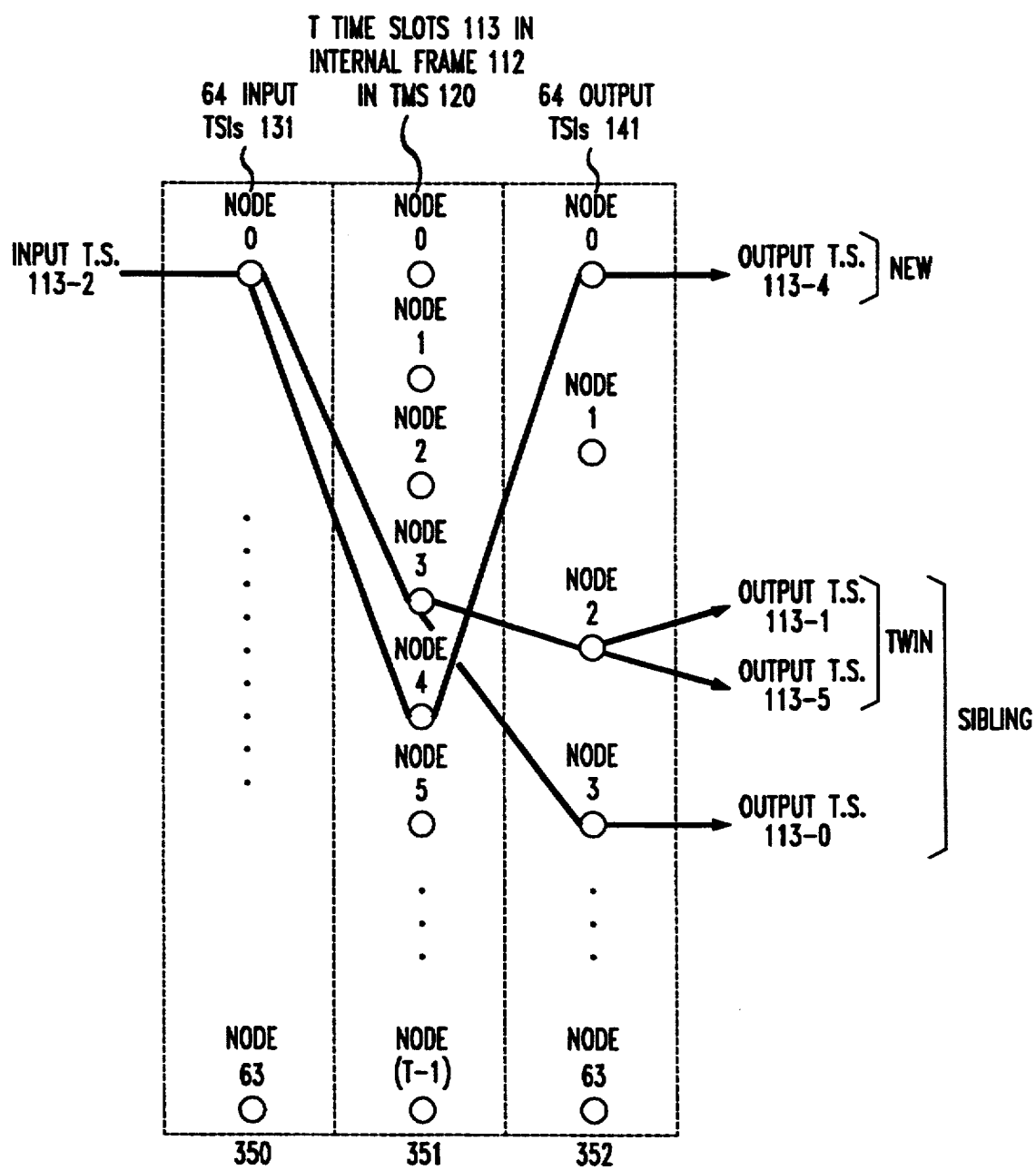
FIG. 4 is an illustrative P-graph of the system of FIG. 1.

As was mentioned in the background portion of this document, it is desirable to branch each broadcast call as close to the output of the switching fabric as possible. This implies a preference hierarchy for the routing of broadcast calls. This hierarchy is best illustrated via a P-graph, which gives a visual representation of a broadcast call tree. An illustrative P-graph for the three-stage time-space-time fabric of system 100 of FIG. 1 is shown in FIG. 4. The P-graph represents each stage of the fabric as a column of nodes. Therefore, the first column 350 of nodes represents the input time stage formed by input TSIs 131, the second column 351 of nodes represents the space stage foraged by TMS 120, and the third column 352 of nodes represents the output time stage formed by output TSIs 141. The P-graph represents each element of a time stage of the fabric as a separate node. Therefore, each one of the nodes 0–63 of the first column 350 represents a different one of input TSIs 131, and each one of the nodes 0–63 of the third column 352 represents a different one of output TSIs 141. The P-graph represents each time slot 113 within a space stage of the fabric as a separate node. Therefore, each node 0-(T−1) of the second column 351 represents a different one of the T time slots 113-0 through 113-(T−1) of a frame 112 within TSI 120, referred to herein as internal time slots and an internal frame.

In the particular example of a broadcast call shown in FIG. 4, the call arrives at the first input TSI 131 (NODE 0 of column 350) in the third time slot 113-2 of each input frame 112 (INPUT T.S. 113-2). During the third internal time slot 113 of each internal frame 112 (NODE 3 of column 351 ) the call is output by the first input TSI 131 and is conveyed by TMS 120 to the third and fourth output TSIs 141 (NODES 2 and 3 of column 352). During the fourth internal time slot 113 of each internal frame 112 (NODE 4 of column 351 ), the call is again output by the first input TSI 131 and is conveyed by TMS 120 to the first output TSI 141 (NODE 0 of column 352). The call is then broadcast on the fifth time slot 113-4 of each output frame 112 (OUTPUT T.S. 113-4) of the first output TSI 141 (NODE 0 of column 352), on the second time slot 113-1 and sixth time slot 113-5 of each output frame 112 (OUTPUT T.S. 113-1; OUTPUT T.S. 113-5) of the third output TSI 141 (NODE 2 of column 352), and on the first time slot 113-0 of each output frame 112 (OUTPUT T.S. 113-0) of the fourth output TSI 141 (NODE 3 of column 352).

Within the call-routing preference hierarchy mentioned above, the highest priority, called a "twin", represents a call branch that can be made within an output TSI 141. This is represented in the third output TSI 141 (NODE 2 of column 352). Here, the resources of only one call (i.e., a link from input TSI 131 to TMS 120 and a link from TMS 120 to output TSI 141) connect two output time slots 113. A twin can be added any time the call already appears in the requisite output TSI 141. The second priority is a "sibling", represented by the call on the fourth output TSI 141 (NODE 3 of column 352). A sibling is possible when the call already exists at TMS 120 and an idle link (internal time slot) is available to the requisite output TSI 141 during the same time-slot period. A sibling therefore adds an output with only half the resources (i.e., only a link from TMS 120 to output TSI 141 ) of a single call. If a twin or a sibling is not possible, then the call is routed as a "new" call—like any point-to-point call—using up two links.

Figure 6:
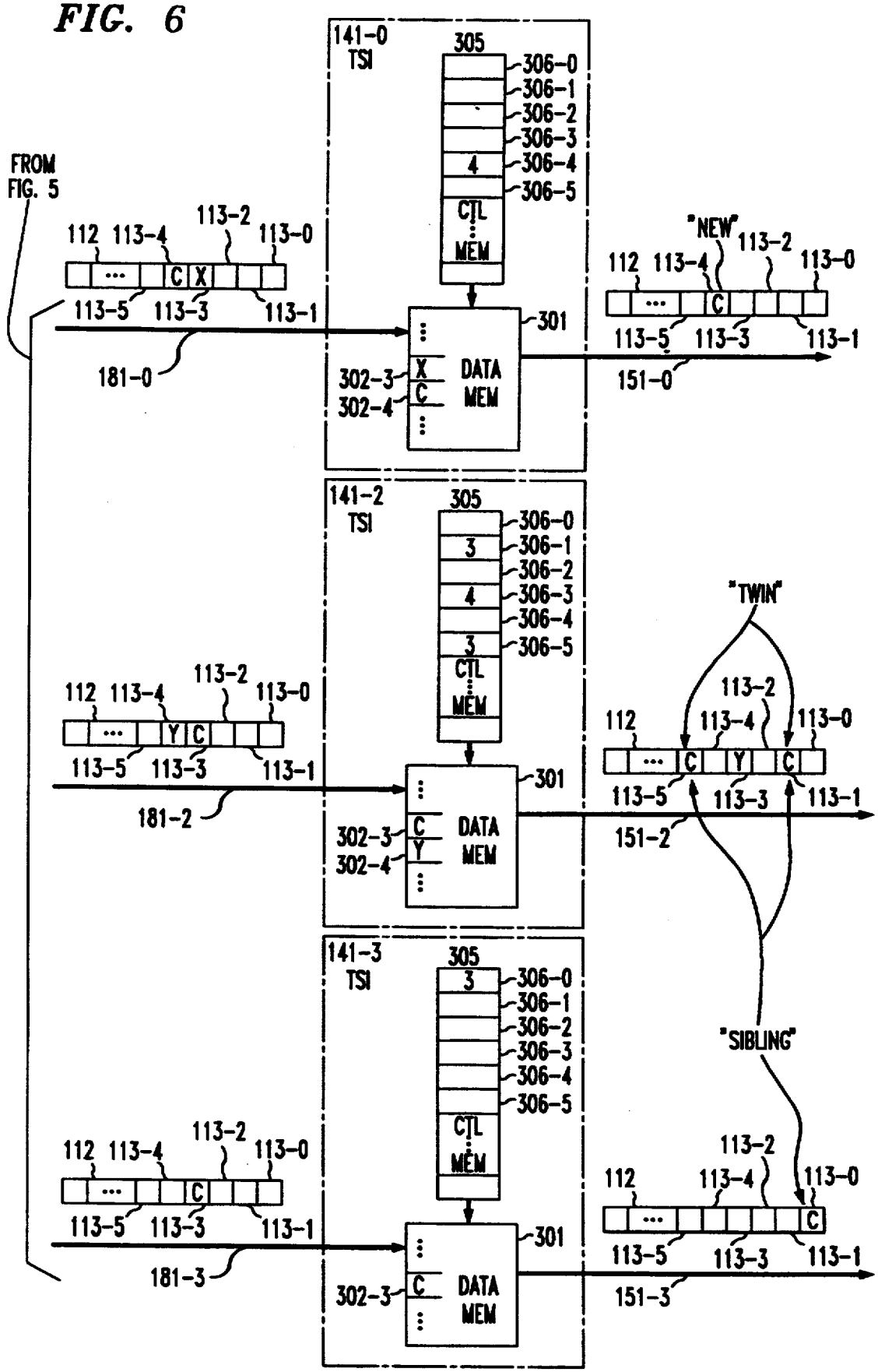

The P-graph of FIG. 4 bears a direct relation to the contents of control memories 305 and 1701, as illustrated in FIGS. 5–6 when placed side-by-side as shown in FIG. 7. A broadcast call (C) arrives in time slot 113-2 of input frames 112 on link 161-0 and is stored in location 302-2 of data memory 301 of TSI 131-0. Control memory 305 of TSI 131-0 identifies incoming time slot 113-2 in its locations 306-3 and 306-4 in order to output call C in time slots 113-3 and. 113-4 of internal frames 112 on link 171-0. Control memory 1701 of selector 1700-0 identifies link 17 1-0 in its location 1703-4 to switch call C from internal time slot 113-4 of internal frames 112 on link 171-0 to internal time slot 113-4 of internal frames 112 on link 181-0. Control memory 1701 of selector 1700-2 identifies link 171-0 in its location 1703-3 to switch call C from time slot 113-3 of internal frames 112 on link 17 1-0 to time slot 113-3 of internal frames 112 on link 181-2. And control memory 1701 of selector 1700-3 identifies link 171-0 in its location 1703-3 to also switch call C from time slot 113-3 of internal frames 112 on link 171-0 to time slot 113-3 of internal frames 112 on link 181-3. Consequently, call C is stored in location 302-4 of data memory 301 of TSI 141-0, in location 302-3 of data memory 301 of TSI 14 1-2, and in location 302-3 of data memory 301 of TSI 141-3. Control memory 305 of TSI 141-0 identifies internal time slot 113-4 in its location 306-4 to output call C in outgoing time slot 113-4 of outgoing frames 112 on link 151-0. Control memory 305 of TSI 141-2 identifies time slot 113-3 in its locations 306-1 and 306-5 to output call C in outgoing time slots 113-1 and 113-5 of outgoing frames 112 on link 151-2. And control memory 305 of TSI 141-3 identifies time slot 113-3 in its location 306-1 to output call C in outgoing time slot 113-0 of outgoing frames 112 on link 151-3.

A switch that has duplicate T-S-T fabrics (as described above) can be physically partitioned into two disjoint three-stage switches, referred to as "pipes", allowing path hunting of the same call independently in each pipe. Normally, for point-to-point call setups, priority is given to one of the two pipes, which improves performance somewhat. However, with broadcasting, even better performance is achieved if priority is assigned in the following order: first pipe twin (first priority); second pipe twin; first pipe sibling; second pipe sibling; first pipe new; and second pipe new (last priority). As new-type broadcast branches are added, they too will have twins and siblings of their own.

Figure 8:
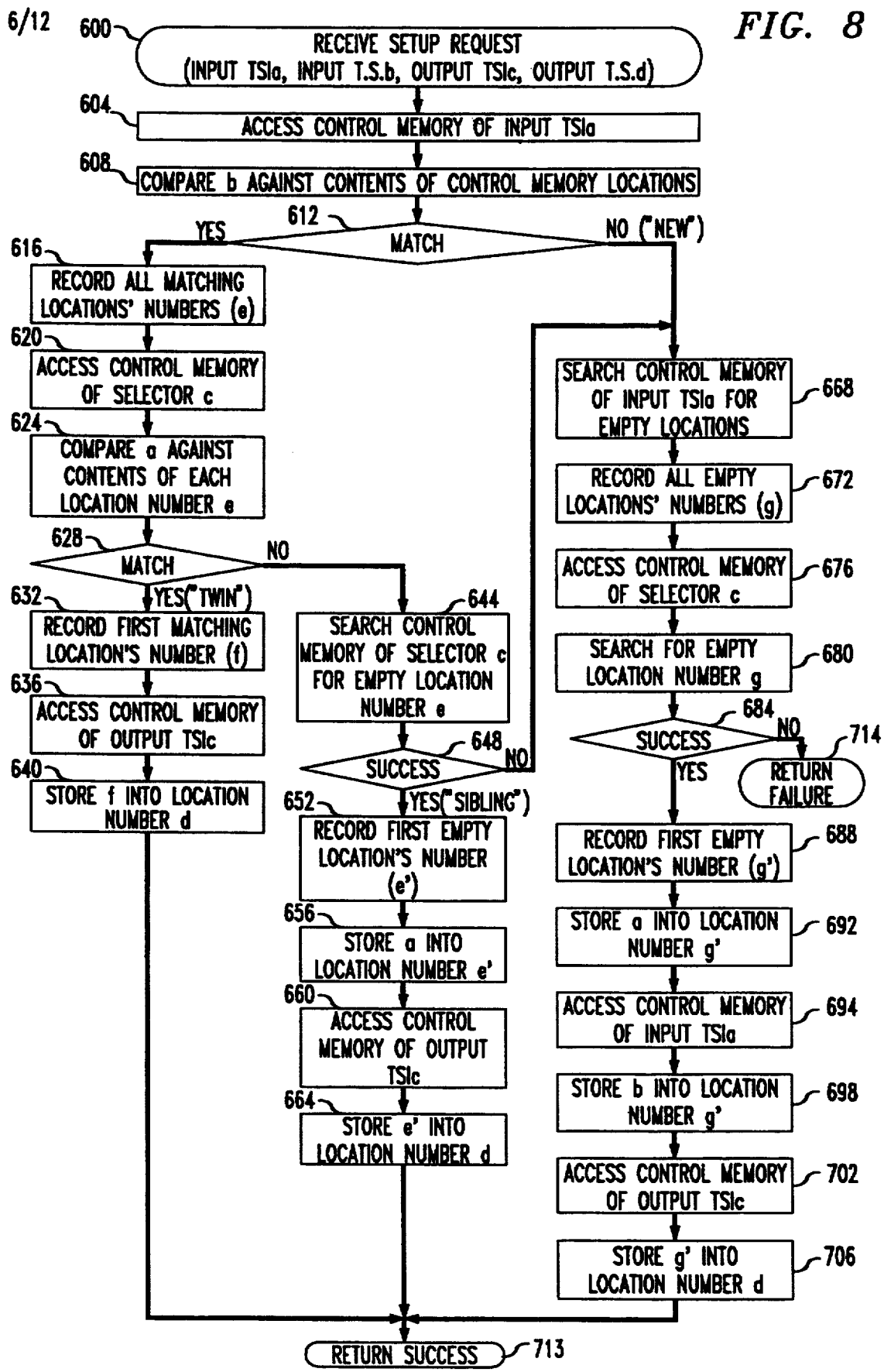
FIG. 8 is a flow diagram of a first embodiment of a path hunt and path setup function of the control processor of the system of FIG. 1.

FIG. 8 shows the path-hunt procedure followed by processor 110. Whether a twin or a sibling can be added is determined by control processor 110 by examining the contents of control memories 305 and 1701. Given that the input TSI 131, input time slot 113, output TSI 141, and output time slot 113 are known from the call-connection request, received at step 600, a twin is determined as follows. Assume that a call has already been established in the example in FIG. 4 from input TSI 130-0 to only time slot 113-1 in output TSI 141-2, and that a request has been received to add the call to time slot 113-5 in the same output TSI 141-2. Control processor 110 accesses control memory 305 of input TSI 131-0, at step 604, to find out which internal time slots 113 are being used for this particular call. It does this by comparing the input time slot 113-0 number to the contents of locations 306 of control memory 305, at step 608. Sensing a match, at step 612, it finds that internal time slots 113-3 and 113-4 are being used for this call, and it records these time slots' numbers, at step 616. Processor 110 then accesses control memory 1701 of selector 1700-2 which is associated with output TSI 141-2 where it wishes to add the call, at step 620. During the time-slot periods of the recorded internal time slots 113-3 and 113-4, it compares contents of locations 1703-3 and 1703-4 of this control memory 1701 against the number of the input TSI 131-0, at step 624. If during one of these time-slot periods of internal time slots 113-3 and 113-4 it finds that the output of selector 1700-2 is connected to input TSI 131-0, as determined at step 628, then the call connection already exists to output TSI 1412, and a twin can be added. In this example, during internal time slot 113-2, control memory 1701 of selector 1700-2 is connected to TMS 120 input port 0 which is connected to input TSI 131-0 where the call originates, and so a twin can be added. Processor 110 therefore records the number of the first location 1703-2 that produced a match at step 628, at step 632, accesses control memory 305 of the specified output TSI 141-2, at step 636, and stores the recorded number—corresponding to the internal time slot 113-2 of the same number—in location 306-5 which corresponds to the desired output time slot 113-5, at step 640. The path hunt and path setup is thereby completed, and processor 110 returns from the path-hunt procedure, at step 713.

Siblings are added in a similar manner, as exemplified by a request to branch the call to output TSI 141-3. Again, control processor 110 begins by examining control memory 305 of input TSI 131-0 to determine which internal time slots 113 are being used for this call (i.e., again internal time slots 113-3 and 113-4, at steps 604–612). If the call does not already exist in output TSI 141-3 (i.e., it is not possible to add it as a twin), as determined at steps 616–628, then it searches through control memory 1701 of selector 1700-2 serving output TSI 141-2 looking for an idle link from TMS 120 to the desired output TSI 141-3 during the time-slot periods of internal time slots 113 during which the call exists on TMS 120—in this case internal times slots 113-3 and 113-4—at step 644. Assuming that this link is idle during internal time slot 113-3, as determined at step 648, a sibling (a branch from TMS 120) can be added. Processor 110 therefore records the number of the first location 1703-3 that produced success at step 648, at step 652, stores the number of input time slot 113-0 into that first location 1703-3, at step 656, accesses control memory 305 of the specified output TSI 141-3, at step 660, and stores the recorded number—corresponding to the internal time slot 113-3 of the same number—in location 306-0 which corresponds to the desired output time slot 113-0, at step 664. The path hunt and path setup is thereby completed, and processor 110 returns from the path-hunt procedure, at step 713.

If no twin or sibling can be found in either pipe, as determined at step 612 or step 648, then a requested connection is added as a new call, as exemplified by the connection to output TSI 141-0. A new call is added in the same way as any other point-to-point call. Control memory 305 of input TSI 131-0 is examined for locations 306 representing idle time slots 113, at step 668; these are recorded, at step 672; control memory 1701 of selector 1700-0 corresponding to the desired output TSI 141-0 is accessed, at step 676; and locations 1703 having the same number as the locations 306 recorded at step 672 are examined to determine if any also represent idle time slots 113, at step 680. For improved speed of search, control memory 305 of input TSI 131-0 is examined for idle time slots at the same time as control memory 1701 of a selector 1700-0 associated with the desired output TSI 141-0 is examined for idle time slots 113. If an internal time slot 113 is found for which the link between input TSI 131-0 and TMS 120 is idle and the link from TMS 120 to output TSI 141-0 is also idle, as determined at step 684, the number of the first such internal time slot—corresponding to the number of the first location 1703 found to represent an idle time slot—is recorded, at step 688, for use by the call. In the example of FIGS. 4 and 5, internal time slot 113-4 is used. This internal time slot 113-4 is assigned to the call by storing the number of input TSI 131-0 into the location 1703-4 whose number was recorded at step 688, at step 692; accessing control memory 305 of input TSI 141-0, at step 694; recording the number of input time slot 113-2 into location 306-4 whose number corresponds to the number recorded at step 688, at step 698; accessing control memory 305 of the specified output TSI 141-0, at step 702; and storing the recorded number—corresponding to the internal time slot 113-4 of the same number—in location 306-4 which corresponds to the desired output time slot 113-4, at step 706. The path hunt and path setup is thereby completed, and processor 110 returns from the path-hunt procedure, at step 713.

Figure 9:
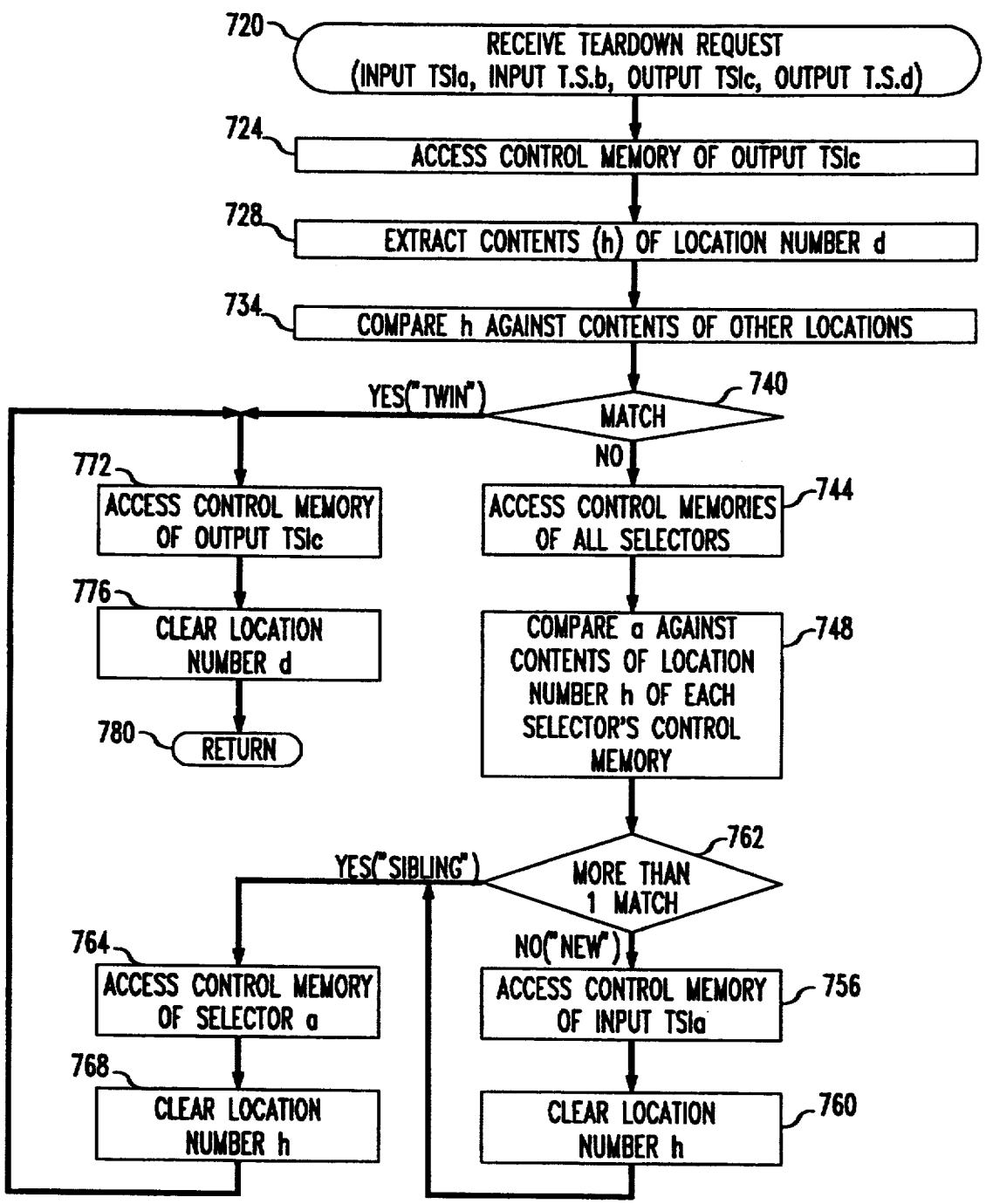
FIG. 9 is a flow diagram of a first embodiment of a path tear-down function of the control processor of the system of FIG. 1.

The procedure for tearing down a call is shown in FIG. 9. To remove a portion of a call, it is necessary to determine if that portion of the call exists as part of a twin, a sibling, or a new. Since a call tree can be dynamic, control processor 110 cannot simply record whether a portion of a call was added as a twin, a sibling, or a new call at the time it was set up, because this condition may change as new branches are added or deleted. To determine if a twin exists to a call requested to be torn down by a request received at step 720, processor 110 accesses control memory 305 of the call's output TSI 141, at step 724, extracts the contents of location 306 that corresponds to the call's output time slot 113, at step 728, and compares these contents against contents of the other locations 306, at step 734. In other words, processor 110 scans through control memory 305 of the call's output TSI 141 for the internal time slot 113 number associated with the call. If the time-slot number appears more than once, as determined at step 740, then a twin exists. Processor 110 therefore accesses control memory 305 of the call's output TSI 141, at step 772, clears the contents of location 306 that corresponds to the call's output time slot 113, at step 776, and then returns, at step 780. Thus, when removing a twin, only the contents of control memory 305 of an output TSI 141 change. No links are taken down.

A drawback to this method is that the entire control memory 305 must be scanned to ensure that a twin does not exist. This takes a long time, which reduces the efficiency of path-hunting. An alternative method is to keep a table 800 of internal time-slot numbers associated with each output TSI 141, as shown in FIG. 10. Each use-count entry 801 in a table 800 is a count of how many output time slots 113 use the corresponding internal time slot 113. Any value greater than one indicates that a twin exists. Since the internal time-slot 113 number is saved when the call is set up, a single access into table 800 of a particular output TSI 141 returns the twin status. Table entry 801 must be incremented when a twin is added, and decremented when a twin is deleted.

If a call is not a part of a twin, then it must be checked for whether it is a part of a sibling. It is especially important to keep track of which output time slots belong to which sibling to ensure that, when taking down parts of a broadcast tree, other parts of the tree are not affected. Siblings can be identified uniquely by the input TSI 13 1, internal time slot 113, and pipe they are associated with. There are also two ways of checking for a sibling. The first requires that all TMS 120 control memories 1701 be checked during the internal time-slot 113 period associated with the call. If more than one control memory 1701 points to the input TSI 131 at which the call originates, then a sibling exists. When a sibling-type call is taken down, only the link to the associated output TSI 141 is removed. This requires changing the contents of control memory 1701 of selector 1700 associated with the output TSI 141, and the contents of control memory 305 of the output TSI 141. Again, the drawback of this method is that all TMS 120 control memories 1701 are involved, which prevents simultaneous path-hunting while a call is being taken down. As with the twins, an alternative method is to keep a table 900 of internal time-slot numbers associated with each input TSI 131, as shown in FIG. 11. Each use-count entry 901 in a table 900 is a count of how many TMS 120 output ports use the corresponding internal time slot 113. Any value greater than one indicates that a sibling exists. Since the internal time-slot number is saved when the call is set up, a single access into a table 900 returns the sibling status. Table entry 901 must be incremented when a sibling is added, and decremented when a sibling is deleted.

If neither a twin nor a sibling exists for this branch of the call, then it exists as a new call. This requires modifying the contents of control memory 305 of the input TSI 13 1, the contents of control memory 1701 of selector 1700 which is associated with the output TSI 141, and the contents of control memory 305 of the output TSI 141, to remove the links to and from TMS 120.

Figure 12:
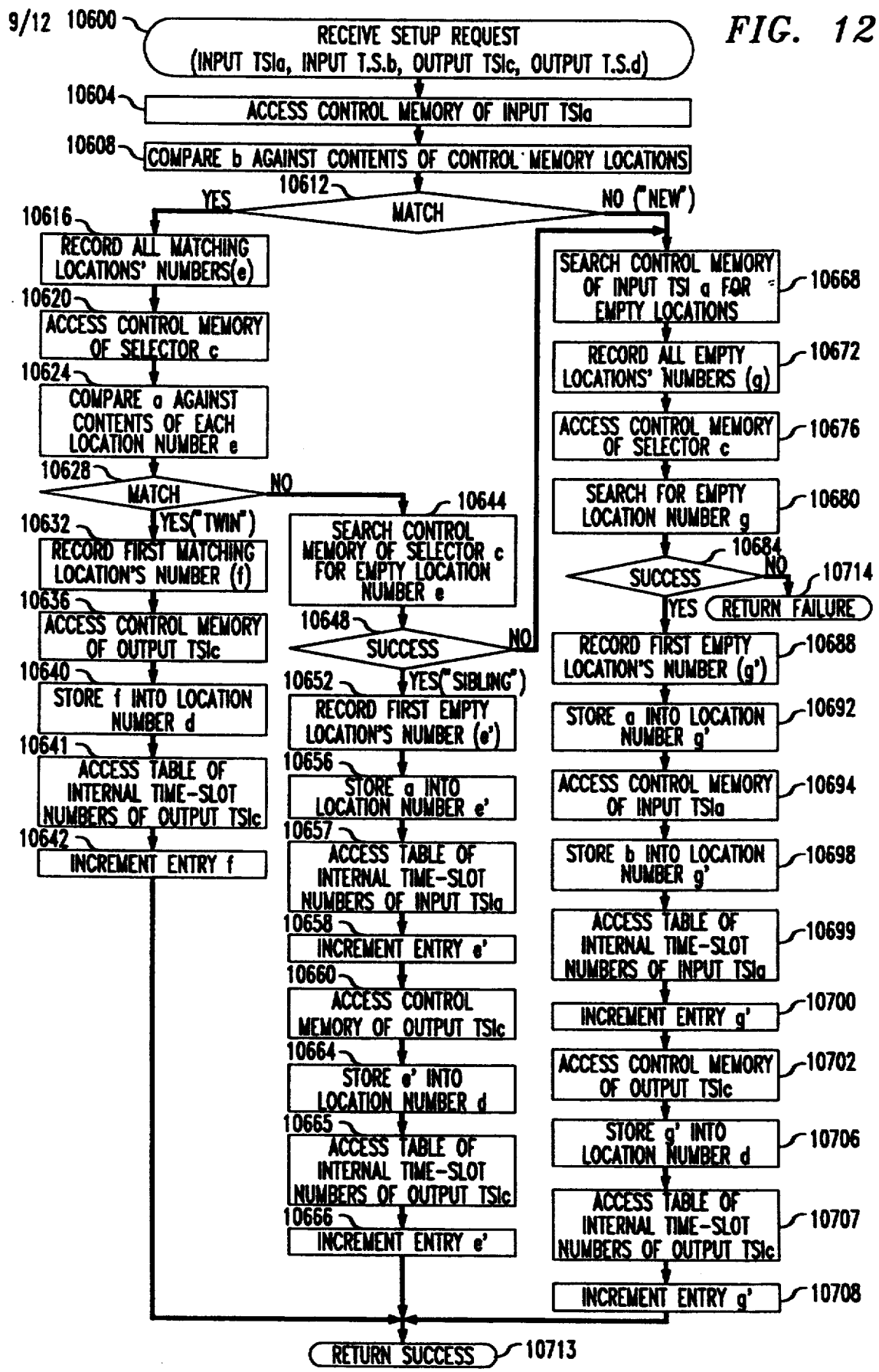
FIG. 12 is a flow diagram of the second embodiment of the path hunt and path setup function of the control processor of the system of FIG. 1.
Figure 13:
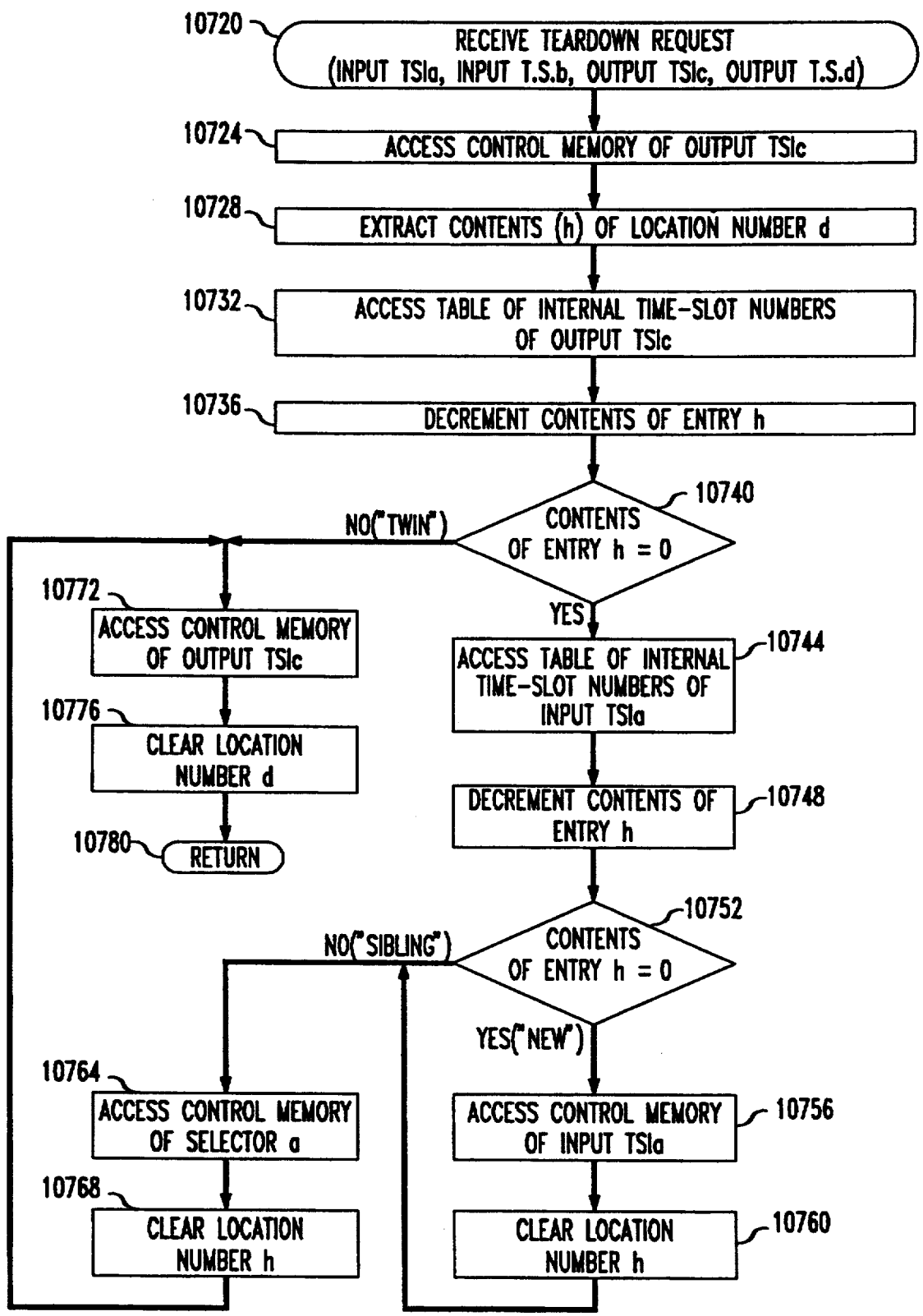
FIG. 13 is a flow diagram of the second embodiment of the path tear-down function of the control processor of the system of FIG. 1.

The procedures of FIGS. 8 and 9 modified to make use of the tables of FIGS. 10 and 11 are shown in FIGS. 12 and 13, respectively.

Steps 10600–10640 of FIG. 12 are identical to steps 600–640 of FIG. 8. But prior to returning after having found and set up a twin call, at step 10713, processor 110 accesses table 800 of the caws output TSI 141, at step 10641, and increments entry 801 which corresponds to the call's internal time slot 113.

Steps 10644–10656 of FIG. 12, are also identical to steps 644–656 of FIG. 8. However, as pan of setting up a sibling call, following step 10656, processor 110 accesses table 900 of the call's input TSI 131, at step 10657, and increments entry 901 which corresponds to the call's internal time slot 113, at step 10658. Processor 110 then performs steps 10660–10664 which are identical to steps 660–664 of FIG. 8. Prior to returning, at step 10713, processor 110 also accesses table 800 of the call's output TSI 141, at step 10665, and increments entry 801 which corresponds to the call's internal time slot 113, at step 10666.

Steps 10668–10698 are likewise identical to steps 668–698 of FIG. 8. However, as part of setting up a new call, following step 10698, processor 110 accesses table 900 of the call's input TSI 131, at step 10699, and increments entry 901 which corresponds to the call's internal time slot 113, at step 10700. Processor 110 then performs steps 10702–10706 which are identical to steps 702–706 of FIG. 8. Prior to returning, at step 107 13, processor 110 also accesses table 800 of the call's output TSI 141, at step 10707, and increments entry 801 which corresponds to the call's internal time slot 113, at step 10708.

Steps 10720–10728 of FIG. 13 are identical to steps 720–728 of FIG. 9. However, after having obtained the number of internal time slot 113 which corresponds to the call, at step 10728, processor 110 accesses table 800 of the call's corresponding output TSI 141, at step 10732, and decrements entry 801 which corresponds to the internal time slot 113 whose number was retrieved at step 10728, at step 10736. Processor 110 then checks the contents of this entry 801 to determine whether they are zero, at step 10740. If not, the call which is being tom down has a twin, and processor 110 proceeds to steps 10772–10776 which duplicate steps 772–776 of FIG. 9. Processor 110 then returns, at step 10780.

If the contents of entry 801 checked at step 10740 are zero, processor 110 accesses table 900 of the call's corresponding input TSI 131, at step 10744, and decrements entry 901 which corresponds to the internal time slot 113 whose number was retrieved at step 10728, at step 10748. Processor 110 then checks the contents of this entry 901 to determine whether they are zero, at step 10752. If not, the call which is being torn down has a sibling, and processor 110 proceeds to steps 10764–10768 which duplicate steps 764–768 of FIG. 9. Processor 110 then returns, at step 10780.

If the contents of entry 901 checked at step 10752 are zero, the call which is being torn down is a point-to-point, i.e., a new, call, and processor 110 proceeds to steps 10756–10760 which duplicate steps 756–760 of FIG. 9. Processor 110 then returns, at step 10780.

While the path-hunt procedures shown and described above may be implemented directly in software, new services may impose path-hunt requirements beyond what presently can reasonably be achieved in software, as mentioned in the introductory portion of this document. Therefore, an implementation in high-speed hardware may be required.

Figure 14:
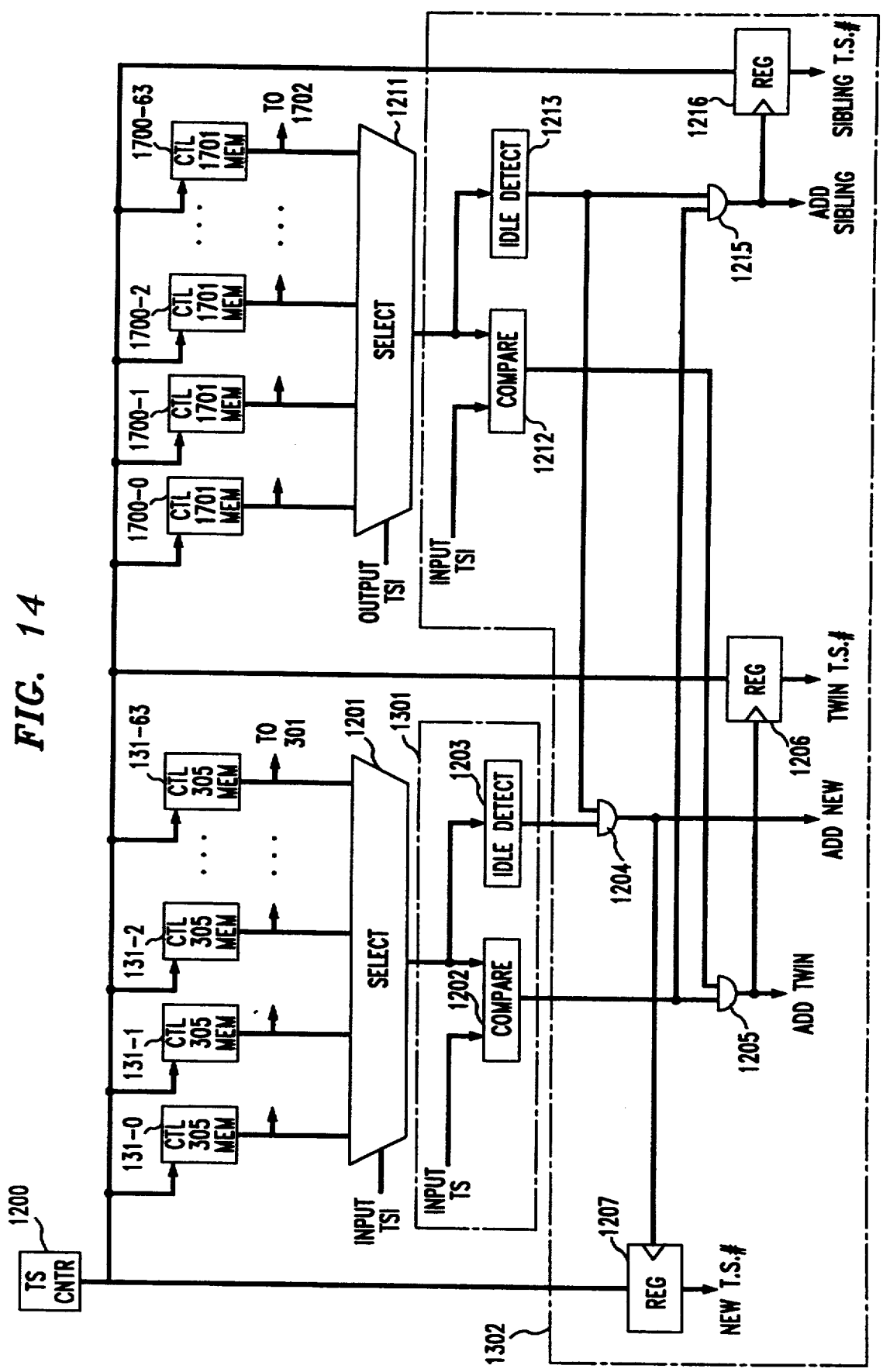
FIG. 14 is a circuit diagram of a first hardware implementation of the path hunt portion of the function of FIGS. 8 and 12.

FIG. 14 shows, in block-diagram form, a hardware implementation for performing a single path hunt. For call setup, only contents of control memories 305 of input TSIs 131 and control memories 1701 of selectors 1700 of TMS 120 need to be examined. It is not absolutely necessary to use the actual control memories 305 and 1701 for the path hunt—for example, duplicates thereof dedicated to the path-hunt function could be used. However, by using the actual control memories, several advantages are gained. First, the memory required to do path hunt grows with the system. Second, it does not add any cost, since the memories are already required to be present in order to do the control function. And third, it allows for the ability to do simultaneous path hunts over disjoint TSI pairs. This last advantage is very important when considering the performance requirements mentioned above.

Locations 306 of control memories 305 of input TSIs 131 and locations 1703 of control memories 1700 of TMS 120 are addressed cyclically by a time slot counter 1200. Each control memory 305 and 1701 is sequentially scanned in its entirety during each frame 112 period. The outputs of control memories 305 are connected to the address inputs of data memories 301 (see FIG. 2) and to inputs of a selector 1201. The outputs of control memories 1701 are connected to the control inputs of selectors 1702 (see FIG. 3) and to inputs of a selector 1211. While control memories 305 and 1701 are being read out sequentially in order to perform their control function, simultaneously a search is performed by the hardware shown in FIG. 14 for twin, sibling, and new connections. The appropriate control memories 305 and 1701 are selected based on the input TSI 131 and output TSI 141 specified by the call-connection request. The number of input TSI 131 specified by a call-connection request is supplied to the control input of selector 1201, while the number of output TSI 141 specified by the call-connection request is supplied to the control input of selector 1211.

Two pieces of information are searched for in each selected control memory 305 and 1701. A comparator 1202 is provided with the number of the input time slot 113 that carries the desired call and with the output of selector 1202, and searches control memory 305 of the input TSI 131 for locations containing the number of the input time slot 113 that carries the desired call. The output of selector 1202 is also provided to an idle detect circuit 1203 which searches the selected control memory 305 for locations 306 indicating idle internal time slots 113. Simultaneously, a comparator 1212 is provided with the number of the input TSI 131 that carries the desired call and with the output of selector 1211, and searches control memory 1701 of selector 1700 serving the output TSI 141 for locations 1703 containing the number of the input TSI 131. The output of selector 1211 is also provided to an idle detect circuit 1213 which searches the selected control memory 1701 for locations 1703, indicating idle internal time slots 113. The outputs of comparators 1202 and 1212 are connected to inputs of an AND gate 1205. If the input time slot number 113 in control memory 305 and the input TSI 131 number are found during the same time-slot interval, then gate 1205 generates an ADD TWIN signal indicating that a twin can be added. The output of comparator 1202 and idle detect circuit 1213 are connected to inputs of an AND an gate 1215. If the input time slot 113 number in control memory 305 and an idle internal time slot 113 in control memory 1701 are found during the same time-slot interval, then gate 1215 generates an ADD SIBLING signal indicating that a sibling can be added. The outputs of idle detect circuits 1203 and 1213 are connected to inputs of an AND gate 1204. If idle time slots 113 are found in both control memories 305 and 1701 during the same time-slot interval, then gate 1204 generates an ADD NEW signal indicating that a new call can be added.

It is possible that a new indication will be found before a twin or a sibling indication occurs. Therefore, in order to ensure that the call is set up according to the priority stated earlier, when an indication of new or sibling occurs, the internal time slot number associated with the indication is saved until either a twin indication is received or the entire control memory has been scanned. This is accomplished by registers 1207 and 1216. Registers 1207 and 1216 have their data inputs connected to the output of time slot counter 1200. The clock input of register 1207 is connected to the output of AND gate 1204. Thus, when AND gate 1204 generates an ADD NEW signal, register 1207 stores the number of internal time slot 113, generated by counter 1200, that can be used for the new call. Similarly, the clock input of register 1216 is connected to the output of AND gate 1215. Thus, when AND gate 1215 generates an ADD SIBLING signal, register 1216 stores the number of internal time slot 113 that can be used for the sibling call. In like manner, the identity of an internal time slot 113 for use by a twin call is stored by a register 1206, whose data input is connected to the output of time slot counter 1200 and whose clock input is connected to the output of AND gate 1205.

Figure 15:
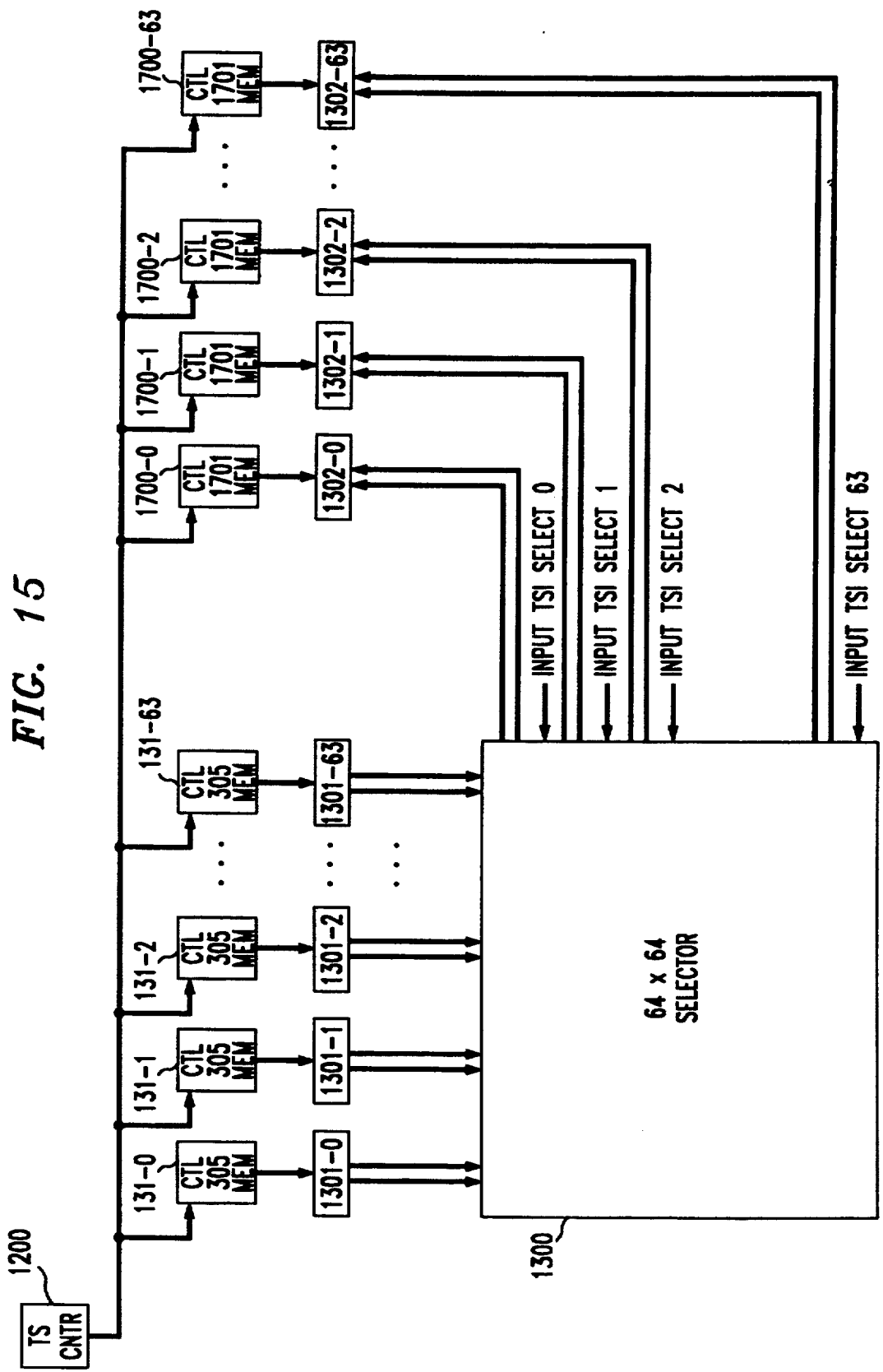
FIG. 15 is a circuit diagram of a second hardware implementation of the path hunt portion of the function of FIGS. 8 and 12.

FIG. 15 expands the path-hunt hardware to perform simultaneous disjoint path hunts. Control memory 305 of each input TSI 131 has its own compare and idle detect unit 1301 comprising comparator 1202 and idle detect circuit 1203 (see FIG. 14). Also, each control memory 1701 of TMS 120 now has its own twin/sibling/new detect circuit 1302 comprising comparator 1212, idle detect circuit 1213, AND gates 1204, 1205, and 1215, and registers 1206, 1207, and 1216 (see FIG. 14). The output pairs of each one of circuits 1301-0 to 1301-63 are connected to input pairs of a 64×64 selector 1300, such as a crossbar switch, whose output pairs are connected to input pairs of each one of circuits 1302-0 to 1302-63. Selector 1300 allows connection of the compare and idle output signals from circuit 1301 of any input TSI 131 to the path-hunt logic 1302 of any of the 64 TMS 120 control memories 1701. Control signals placed by processor 110 on input TSI select lines which control the operation of selector 1300 determine which circuit 1301 gets connected to which circuit 1302. Thus, as many as 64 path hunts can be performed simultaneously for every frame 112 period. For taking down calls, use of the sibling and twin counter tables 800 and 900, described earlier in conjunction with FIGS. 8 and 9, is optimum. If these counter tables 800 and 900 are maintained in software, then control processor 110 need only interrogate appropriate entries 801 and 901 of these tables and then directly issue commands to change the appropriate control memories 305 and 1701. No assistance is required from the hardware path-hunt logic.

Of course, it should be understood that various changes and modifications to the illustrative embodiment described above will be apparent to those skilled in the art. For example, while the invention was described in the context of a three-stage time-space-time switching fabric, it is equally applicable to space-time-space or pure space architectures, and to architectures having more than three stages. Also, the control processor may comprise a multiprocessor system where many call requests are handled in parallel, distributed across the processor complex. This distributed processing fits well with the concept of distributed path hunting presented above. Furthermore, while broadcasting is required for some calls, if it were known at the time the path hunt is requested that the call was not a broadcast call, then the path hunt would be completed when the first new indication occurred. This is especially useful for multirate calls where a number of time slots must be found between the same input and output TSI pair. It is likely that broadcast status is available during the higher-level call processing. Even if it is not, a simple lookup can be performed on a software based busy/idle table for all inputs. If the input is busy, then a broadcast call is being requested. In order to gain a performance increase, the next path hunt request must be ready to start as soon as the last one completes. The results must also be stored quickly in the control memories to prevent the next path hunt from using the same idle time slot. In order to accomplish this, FIFO buffers must be provided to queue up information required for each path hunt for the compare functions and to save the results until they can be loaded into the control memories in the next frame period. The result FIFO must be capable of accepting a new result at the same time it is updating the control memory. Thus, the FIFO must be double buffered. Further yet, the hierarchical nature of the SONET and SDH formats may be exploited to decrease the path hunt time for multirate calls. One can envision grouping together time slots and treating the group as a super time slot. For instance, an STS-12 is made up of 12 STS-1s, each comprising 810 time slots. A busy/idle table can be created at the STS-1 level comprising just twelve 2-bit words. One bit would be used to indicate if the entire super time slot is busy, as would be the case when switching a full STS-1. The second bit would indicate when only a portion of the super time slot is being used. This would be used when a lower bandwidth call, such as an N×DS0 call, has been routed using only a portion of the super time slot. Any additional path hunts for lower bandwidth calls would be hunted within this super time slot first. Once this super time slot is filled with lower bandwidth calls, the next idle super time slot is used. In actual practice, multiple time slot levels would be required corresponding to the SONET multiplexing hierarchy. For example, as mentioned earlier, the invention applies to pure space-switching architectures as well as time-space-time architectures. Such would be the case for an asynchronous transfer mode (ATM) distribution network, which provides the means for constructing large ATM switches built from smaller ATM switching modules. In this scenario, the invention hunts cells (packets) instead of time slots. The invention specifically addresses the problem of duplicating ATM cells to provide broadcast capability. Such changes and modifications can be made without departing from the spirit and the scope of the invention and without diminishing its attendant advantages. It is therefore intended that all such changes and modifications be covered by the following claims.

What is claimed is:

1. In a switching system having a plurality of switching stages including an input stage having a plurality of inputs and an output stage having a plurality of outputs, each stage having a corresponding at least one control memory for controlling said stage, a path-hunt method comprising the steps of:
   (A) in response to a request to connect a first input to a first output, examining contents of the corresponding at least one control memory of at least one of the switching stages to determine if the first input is already connected to the output stage;
   (B) in response to a determination that the first input is already connected to the output stage, modifying contents of the corresponding at least one control memory of the output stage to connect the first input to the first output;
   (C) in response to one of (a) the request and (b) a determination that the first input is not already connected to the output stage, examining contents of the corresponding at least one control memory of at least one of the switching stages to determine if the first input can be connected to the output stage; and
   (D) in response to a determination that the first input is not already but can be connected to the output stage,
      (i) modifying contents of the corresponding at least one control memory of at least one of the switching stages to connect the first input to the output stage, and
      (ii) modifying contents of the corresponding at least one control memory of the output stage to connect the first input to the first output.

2. The method of claim 1 in a switching system wherein the output stage includes a plurality of switching nodes each having at least one output and each node is controlled by its own control memory of the at least one control memory corresponding to the output stage, wherein:

step (A) is performed to determine if the first input is already connected to the output stage node having the first output;

step (B) comprises the step of
   in response to a determination that the first input is already connected to the output stage node having the first output, modifying contents of the control memory of the output stage node having the first output to connect the first input to the first output;

step (C) is performed in response to one of (a) the request and (b) a determination that the first input is not already connected to the output stage node having the first output, to determine if the first input can be connected to the output stage node having the first output;

step (D) is performed in response to a determination that the first input is not already but can be connected to the output stage node having the first output, step (D)(i) is performed to connect the first input to the output stage node having the first output; and step (D)(ii) comprises the step of
modifying contents of the control memory of the output stage node having the first output to connect the first input to the first output.

3. The method of claim 1 in a switching system having at least three switching stages including an intermediate stage coupled between the input stage and the output stage, wherein:

step (A) comprises the steps of
examining contents of the corresponding at least one control memory of the input stage to determine if the first input is already connected to the intermediate stage, and examining contents of the corresponding at least one control memory of the intermediate stage to determine if the first input is already connected from the intermediate stage to the output stage;

step (C) comprises the step of
examining contents of the corresponding at least one control memory of the intermediate stage to determine if the first input can be connected from the intermediate stage to the output stage;

step (D)(i) comprises the step of
modifying contents of the corresponding at least one control memory of the intermediate stage to connect the first input from the intermediate stage to the output stage.

4. The method of claim 3 comprising the further steps of:
in response to one of (a) the request and (b) a determination that the first input is not already connected to the intermediate stage, examining contents of the corresponding at least one control memory of the intermediate stage and of the corresponding at least one control memory of the input stage to determine if the first input can be connected from the input stage through the intermediate stage to the output stage; and in response to a determination that the first input is not already connected to the intermediate stage but can be connected from the input stage through the intermediate stage to the output stage,
(i) modifying contents of the corresponding at least one control memory of the input stage to connect the first input to the intermediate stage,
(ii) modifying contents of the corresponding at least one control memory of the intermediate stage to connect the first input from the intermediate stage to the output stage, and
(iii) modifying contents of the corresponding at least one control memory of the output stage to connect the first input to the first output.

5. The method of claim 1 in a switching system having at least three stages including an input stage having a plurality of input switching nodes each having at least one input and controlled by its own control memory of the at least one control memory corresponding to the input stage, an intermediate stage having a plurality of intermediate switching nodes each controlled by its own control memory of the at least one control memory corresponding to the intermediate stage, and an output stage having a plurality of output switching nodes each having at least one output and controlled by its own control memory of the at least one control memory corresponding to the output stage, wherein:

step (A) comprises the steps of
examining contents of the control memory of the input node having the first input to determine if the first input is already connected to an individual intermediate node;

examining contents of the control memory of the individual intermediate node to determine whether the first input is already connected through the individual intermediate node to the output node having the first output;

step (B) comprises the step of
in response to a determination that the first input is already connected through the individual intermediate node to the output node having the first output, modifying contents of the control memory of the output node having the first output to connect the first input to the first output;

step (C) comprises the step of
in response to at least one of (a) a determination that the first input is already connected to the individual intermediate node and (b) a determination that the first input is not already connected through the individual intermediate node to the output node having the first output, examining contents of the control memory of the individual intermediate node to determine whether the first input can be connected through the individual intermediate node to the output node having the first output;

step (D)(i) comprises the step of
in response to a determination that the first input is not already but can be connected through the individual intermediate node to the output node having the first output, modifying contents of the control memory of the individual intermediate node to connect the first input through the individual intermediate node to the output node having the first output; and step (D)(ii) comprises the step of
modifying contents of the control memory of the output node having the first output to connect the first input to the first output.

6. The method of claim 5 comprising the further steps of:
(E) in response to one of (a) the request and (b) a determination that the first input is not already connected to an individual intermediate node, examining contents of the control memories of the input node having the first input and of at least one of the intermediate nodes to determine if the first input can be connected from the input node having the first input through one of the at least one of the intermediate nodes to the output node having the first output;

(F) in response to a determination that the first input is not already connected to the individual intermediate node but can be connected from the input node having the first input through one of the at least one of the intermediate nodes to the output node having the first output,
  (i) modifying contents of the control memories of the input node having the first input and the one intermediate node to connect the first input to the one intermediate node and through the one intermediate node to the output node having the first output, and
  (ii) modifying contents of the control memory of the output node having the first output to connect the first input to the first output.

7. The method of claim 1 in a time-division multiplexed switching system comprising an input stage including a plurality of input switching nodes each for receiving repeating input frames of a plurality of input time slots, an intermediate stage coupled to the input stage and including a plurality of intermediate switching nodes, and an output stage coupled to the intermediate stage and including a plurality of output switching nodes each for transmitting repeating output frames of a plurality of output time slots, each node being controlled by its own control memory of the at least one control memory corresponding to the stage which includes said each node, wherein:
  step (A) comprises the steps of
    in response to a request to connect a first input time slot of input frames received by a first input node to a first output time slot of output frames transmitted by a first output node, examining contents of the control memory of the first input node to determine if the first input time slot is already connected to an individual intermediate node, and
    examining contents of the control memory of the individual intermediate node to determine whether the first input time slot is already connected to the first second output node;
  step (B) comprises the step of
    in response to a determination that the first input time slot is already connected to the first output node, modifying contents of the control memory of the first output node to connect the first input time slot to the first output time slot;
  step (C) comprises the step of
    in response to at least one of (a) a determination that the first input time slot is already connected to the individual intermediate node and (b) a determination that the first input time slot is not already connected to the first output node, examining contents of the control memory of the individual intermediate node to determine whether the first input time slot can be connected to the first output node;
  step (D)(i) comprises the step of
    in response to a determination that the first input time slot is not already but can be connected to the first output node, modifying contents of the control memory of the individual intermediate node to connect the first input time slot to the first output node; and
  step (D)(ii) comprises the step of
    modifying contents of the control memory of the first output node to connect the first input time slot to the first output time slot.

8. The method of claim 7 comprising the further steps of:
  (E) in response to one of (a) the request and (b) a determination that the first input time slot is not already connected to an individual intermediate node, examining contents of the control memories of the first input node and of at least one intermediate node to determine if the first input time slot can be connected through one of the at least one of the intermediate nodes to the first output node;
  (F) in response to a determination that the first input time slot is not already but can be connected through one of the at least one of the intermediate nodes to the first output node,
    (i) modifying contents of the control memories of the first input node and the one intermediate node to connect the first input time slot through the one intermediate node to the first output node, and
    (ii) modifying contents of the control memory of the first output node to connect the first input time slot to the first output time slot.

9. The method of claim 1 wherein:
every step of examining control memory contents comprises the step of
  monitoring control memory contents being read out for the purpose of controlling the control memory's corresponding stage.

10. The method of claim 1 wherein:
every step of examining control memory contents is performed by apparatus dedicated to performing the examining.

11. The method of claim 1 wherein:
all steps of examining control memory contents are performed in parallel by hardware dedicated to performing the examining.

12. The method of claim 7 wherein:
every step of examining control memory contents comprises the step of
  monitoring control memory contents being read out for the purpose of controlling the control memory's corresponding node.

13. The method of claim 12 wherein:
every step of monitoring is performed by apparatus dedicated to performing the monitoring.

14. The method of claim 12 wherein:
all steps of monitoring are performed in parallel by hardware dedicated to performing the monitoring.

15. In a switching system having a plurality of switching stages including an input stage having a plurality of inputs and an output stage having a plurality of outputs, a path-hunt method comprising the steps of:
  (A) in response to a request to connect a first input to a first output, determining whether the first input is already connected to the output stage;
  (B) in response to a determination that the first input is already connected to the output stage,
    (i) connecting the first input to the first output at the output stage, and
    (ii) updating a count that represents instances of present use of the connection to the output stage;
  (C) in response to one of (a) the request and (b) a determination that the first input is not already connected to the output stage, determining whether the first input can be connected to the output stage;

(D) in response to a determination that the first input is not already but can be connected to the output stage,
(i) connecting the first input to the output stage,
(ii) connecting the first input to the first output at the output stage, and
(iii) updating the count;
(E) in response to a request to disconnect the first input from the first output,
(i) disconnecting the first input from the first output at the output stage, and
(ii) updating the count;
(F) in response to the count updated at step (E)(ii) representing at least one instance of present use of the connection to the output stage, maintaining the connection of the first input to the output stage; and
(G) in response to the count updated at step (E)(ii) representing no instances of present use of the connection to the output stage, breaking the connection of the first input to the output stage.

16. In a switching system having at least three switching stages including an input stage having a plurality of inputs, an output stage having a plurality of outputs, and an intermediate stage coupled between the input stage and the output stage, a path-hunt method comprising the steps of:
(A) in response to a request to connect a first input to a first output,
(i) determining if the first input is already connected from the input stage to the intermediate stage, and
(ii) determining if the first input is already connected from the intermediate stage to the output stage;
(B) in response to a determination that the first input is already connected from the intermediate stage to the output stage,
(i) connecting the first input to the first output at the output stage, and
(ii) updating a first count that represents instances of present use of the connection from the intermediate stage to the output stage;
(C) in response to at least one of (a) a determination that the first input is already connected from the input stage to the intermediate stage and (b) a determination that the first input is not already connected from the intermediate stage to the output stage, determining whether the first input can be connected from the intermediate stage to the output stage;
(D) in response to a determination that the first input is not already but can be connected from the intermediate stage to the output stage,
(i) connecting the first input from the intermediate stage to the output stage,
(ii) updating a second count that represents instances of present use of the connection from the input stage to the intermediate stage,
(iii) connecting the first input to the first output at the output stage, and
(iv) updating the first count;
(E) in response to a request to disconnect the first input from the first output,
(i) disconnecting the first input from the first output at the output stage, and
(ii) updating the first count;
(F) in response to the first count updated at step (E)(ii) representing at least one instance of present use of the connection from the intermediate stage to the output stage, maintaining the connection of the first input from the intermediate stage to the output stage;
(G) in response to the first count updated at step (E)(ii) representing no instances of present use of the connection from the intermediate stage to the output stage,
(i) breaking the connection of the first input from the intermediate stage to the output stage, and
(ii) updating the second count;
(H) in response to the second count updated at step (G)(ii) representing at least one instance of present use of the connection from the input stage to the intermediate stage, maintaining the connection of the first input from the input stage to the intermediate stage; and
(I) in response to the second count updated at step (G)(ii) representing no instances of present use of the connection from the input stage to the intermediate stage, breaking the connection of the first input from the input stage to the intermediate stage.

17. The method of claim 16 in a switching system including an input stage having a plurality of input switching nodes each having at least one input, and an output stage having a plurality of output switching nodes each having at least one output, wherein:
step (B)(ii) comprises the step of
updating a first count that represents instances of present use of the connection from the intermediate stage to an output node having the first output; and
step (D)(ii) comprises the step of
updating a second count that represents instances of present use of the connection from an input node having the first input to the intermediate stage.

18. The method of claim 16 in a time-division multiplexed switching system comprising an input stage including a plurality of input switching nodes each for receiving repeating input frames of a plurality of input time slots, an intermediate stage coupled to the input stage and including a plurality of intermediate switching nodes, and an output stage coupled to the intermediate stage and including a plurality of output switching nodes each for transmitting repeating output frames of a plurality of output time slots, wherein:
step (A)(i) comprises the step of
in response to a request to connect a first input time slot of input frames received by a first input node to a first output time slot of output frames transmitted by a first output node, determining if the first input time slot is already connected from the first input node to an individual intermediate node;
step (A)(ii) comprises the step of
determining whether the first input time slot is already connected from the individual intermediate node to the first output node;
step (B)(i) comprises the step of
in response to a determination that the first input time slot is already connected to the first output node, connecting the first input time slot to the first output time slot at the first output node;
step (B)(ii) comprises the step of updating a first count that represents instances of present use of the first time slot's connection from the intermediate stage to the first output node;

step (C) comprises the step of
in response to at least one of (a) a determination that the first input time slot is already connected from the first input node to the individual intermediate node and (b) a determination that the first input time slot is not already connected from the individual intermediate node to the first output node, determining whether the first input time slot can be connected from the individual intermediate node to the first output node;

step (D)(i) comprises the step of
in response to a determination that the first input time slot is not already but can be connected from the individual intermediate node to the first output node, connecting the first input time slot from the individual intermediate node to the first output node;

step (D)(ii) comprises the step of
updating a second count that represents instances of present use of the first time slot's connection from the first input node to the intermediate stage;

step (D)(iii) comprises the step of
connecting the first time slot to the first output time slot at the first output node;

step (E)(i) comprises the step of
in response to a request to disconnect the first input time slot from the first output time slot, disconnecting the first input time slot from the first output time slot at the first output node;

step (F) comprises the step of
in response to the first count updated at step (E)(ii) representing at least one instance of present use of the connection from the intermediate stage to the first output node, maintaining the connection of the first input time slot from the individual intermediate node to the first output node;

step (G)(i) comprises the step of
in response to the first count updated at step (E)(ii) representing no instances of present use of the connection from the intermediate stage to the first output node, breaking the connection of the first input time slot from the individual intermediate node to the first output node;

step (H) comprises the step of
in response to the second count updated at step (G)(ii) representing at least one instance of present use of the connection from the first input node to the intermediate stage, maintaining the connection of the first input time slot from the first input node to the individual intermediate node; and step (I) comprises the step of
in response to the second count updated at step (G)(ii) representing no instance of present use of the connection from the first input node to the intermediate stage, breaking the connection of the first input time slot from the first input node to the individual intermediate node.

19. The method of claim 16 in a time-division multiplexed switching system comprising an input stage including a plurality of input switching nodes each for receiving repeating input frames of a plurality of input time slots and for transmitting repeating first internal frames of a plurality of first internal time slots, an intermediate stage coupled to the input stage and including a plurality of intermediate switching nodes for receiving the first internal frames and transmitting repeating second internal frames of a plurality of second internal time slots, and an output stage coupled to the intermediate stage and including a plurality of output switching nodes for receiving the second internal frames and each for transmitting repeating output frames of a plurality of output time slots, wherein:

step (A)(i) comprises the step of
in response to a request to connect a first input time slot of input frames received by a first input node to a first output time slot of output frames transmitted by a first output node, determining if the first input time slot is already connected to a first internal time slot;

step (A)(ii) comprises the step of
in response to a determination that the first input time slot is already connected to a first internal time slot, determining whether the first internal time slot is already connected to a second internal time slot of a second internal frame received by the first output node;

step (B)(i) comprises the step of
in response to a determination that the first internal time slot is already connected to a second internal time slot of a second internal frame received by the first output node, connecting the second internal time slot to the first output time slot at the first, output node;

step (B)(ii) comprises the step of
updating a first count that represents instances of present use of the second internal time slot;

step (C) comprises the step of
in response to at least one of (a) a determination that the first input time slot is already connected to a first internal time slot and (b) a determination that the first input time slot is not already connected to a second internal time slot of a second internal frame received by the first output node, determining whether a second internal time slot of a second internal frame that is (a) transmitted by an intermediate node that receives a first internal frame containing the first internal time slot and (b) received by the first output node, is idle;

step (D)(i) comprises the step of
in response to a determination that the first input time slot is not already connected to a second internal time slot of a second internal frame received by the first output node but that a second internal time slot of a second internal frame that is (a) transmitted by an intermediate node that receives a first internal frame containing the first internal time slot and (b) received by the first output node, is idle, connecting the first internal time slot to the idle second internal time slot at the intermediate node that receives the first internal frame containing the first internal time slot;

step (D)(ii) comprises the step of
updating a second count that represents instances of present use of the first internal time slot;

step (D)(iii) comprises the step of
connecting the second internal time slot to the first output time slot at the first output node;

step (E)(i) comprises the step of in response to a request to disconnect the first input time slot from the first output time slot, disconnecting the second internal time slot from the first output time slot at the first output node;

step (F) comprises the step of in response to the first count updated at step (E)(ii) representing at least one instance of present use of the second internal time slot, maintaining the connection of the first internal time slot to the second internal time slot;

step (G)(i) comprises the step of in response to the first count updated at step (E)(ii) representing no instances of present use of the second internal time slot, breaking the connection of the first internal time slot to the second internal time slot;

step (H) comprises the step of in response to the second count updated at step (G)(ii) representing at least one instance of present use of the first internal time slot, maintaining the connection of the first input time slot to the first internal time slot; and step (I) comprises the step of in response to the second count updated at step (G)(ii) representing no instance of present use of the first internal time slot, breaking the connection of the first input time slot to the first internal time slot.

20. In a switching system having a plurality of switching stages including an input stage having a plurality of inputs and an output stage having a plurality of outputs, each stage having a corresponding at least one control memory for controlling connection establishment by said stage, a path-hunt method comprising the steps of:

reading control words out of the corresponding at least one control memory of one stage for a purpose of causing the one stage to establish connections defined by the control words read out of the corresponding at least one control memory of the one stage;

reading control words out of the corresponding at least one control memory of another stage for a purpose of causing the other stage to establish connections defined by the control words read out of the corresponding at least one control memory of the other stage;

in response to a request to connect a first input to a first output, monitoring in parallel the control words being read out of the corresponding at least one control memory of the one stage and the corresponding at least one control memory of the other stage; and determining, from the monitoring of the control words being read out of the corresponding control memories of the one and the other stages, whether the first input can be connected to the first output either as a branch of an existing connection or as a new connection.

21. The method of claim 20 wherein:

each step of reading control words out of the corresponding at least one control memory comprises the step of cyclically reading control words out of the control memory; and the step of monitoring comprises the step of monitoring in parallel the control words being read out of the control memories of the one and the other stages during a single cycle of reading out of the control memories.

22. The method of claim 20 in a switching system having at least three switching stages including an intermediate stage coupled between the input stage and the output stage, wherein:

the step of reading control words out of the corresponding at least one control memory of one stage comprises the step of reading control words out of the corresponding at least one control memory of the one stage for a purpose of controlling interconnection between the intermediate stage and the output stage;

the step of reading control words out of the corresponding at least one control memory of another stage comprises the step of reading control words out of the corresponding at least one memory of the other stage for a purpose of controlling interconnection between the input stage and the intermediate stage;

the step of monitoring comprises the steps of monitoring the control words being read out of the corresponding at least one control memory of the one stage to determine whether the first input is or can be connected from the intermediate stage to the output stage, and monitoring, in parallel with the monitoring of the control words being read out of the corresponding at least one control memory of the one stage, the control words being read out of the corresponding at least one control memory of the other stage to determine whether the first input is or can be connected from the input stage to the intermediate stage; and the step of determining comprises the step of in response to determinations made by the steps of monitoring, determining whether the first input can be connected to the first output either as a twin to an existing connection, or as a sibling to an existing connection, or as a new connection.

23. The method of claim 22 wherein:

each step of reading control words out of the corresponding at least one control memory comprises the step of cyclically reading control words out of the control memory; and each step of monitoring comprises the step of monitoring the control words being read out of the control memory during a single cycle of reading out of the control memory.

24. A switching system comprising:

a plurality of switching stages including an input stage having a plurality of inputs and an output stage having a plurality of outputs;

each stage has a corresponding at least one control memory for controlling said stage;

first means responsive to a request to connect a first input to a first output, for examining contents of the corresponding at least one control memory of at least one of the switching stages to determine if the first input is already connected to the output stage;

second means responsive to one of (a) the request and (b) a determination that the first input is not already connected to the output stage, for examining contents of the corresponding at least one control memory of at least one of the switching stages to determine if the first input can be connected to the output stage;

third means responsive to a determination that the first input is not already but can be connected to the output stage, for modifying contents of the corresponding at least one control memory of at least one of the switching stages to connect the first input to the output stage; and fourth means responsive to a determination that the first input is not already but can be connected to the output stage or to a determination that the first input is already connected to the output stage, for modifying contents of the corresponding at least one control memory of the output stage to connect the first input to the first output.

25. The switching system of claim 24 wherein:

the output stage includes a plurality of switching nodes each having at least one output;

each node is controlled by its own control memory of the at least one control memory corresponding to the output stage;

the first means examine control memory contents to determine if the first input is already connected to the output stage node having the first output;

the second means comprise fifth means responsive to one of (a) the request and (b) a determination that the first input is not already connected to the output stage node having the first output, for examining contents of the corresponding at least one control memory of the at least one of the switching stages to determine if the first input can be connected to the output stage node having the first output;

the third means comprise sixth means responsive to a determination that the first input is not already but can be connected to the output stage node having the first output, for modifying contents of the corresponding at least one control memory of the at least one of the switching stages to connect the first input to the output stage node having the first output; and the fourth means comprise sixth means responsive to a determination that the first input is not already but can be connected to the output stage node having the first output or to a determination that the first input is already connected to the output stage node having the first output, for modifying contents of the control memory of the output stage node having the first output to connect the first input to the first output.

26. The switching system of claim 24 wherein:

the plurality of switching stages comprise at least three switching stages including an intermediate stage coupled between the input stage and the output stage;

the first means comprise fifth means for examining contents of the corresponding at least one control memory of the input stage to determine if the first input is already connected to the intermediate stage, and sixth means for examining contents of the corresponding at least one control memory of the intermediate stage to determine if the first input is already connected from the intermediate stage to the output stage;

the second means comprise seventh means for examining contents of the corresponding at least one control memory of the intermediate stage to determine if the first input can be connected from the intermediate stage to the output stage; and the third means comprise eighth means for modifying contents of the corresponding at least one control memory of the intermediate stage to connect the first input from the intermediate stage to the output stage.

27. The switching system of claim 26 further comprising:

ninth means responsive to one of (a) the request and (b) a determination that the first input is not already connected to the intermediate stage, for examining contents of the corresponding at least one control memory of the intermediate stage and of the corresponding at least one control memory of the input stage to determine if the first input can be connected from the input stage through the intermediate stage to the output stage; and tenth means responsive to a determination that the first input is not already connected to the intermediate stage but can be connected from the input stage through the intermediate stage to the output stage, for modifying contents of the corresponding at least one control memory of the input stage to connect the first input to the intermediate stage; wherein the eighth means are further responsive to the determination that the first input is not already connected to the intermediate stage but can be connected from the input stage through the intermediate stage to the output stage, for modifying contents of the corresponding at least one control memory of the intermediate stage to connect the first input from the intermediate stage to the output stage; and the fourth means are further responsive to the determination that the first input is not already connected to the intermediate stage but can be connected from the input stage through the intermediate stage to the output stage, for modifying contents of the corresponding at least one control memory of the output stage to connect the first input to the first output.

28. The switching system of claim 24 wherein:

the plurality of switching stages comprise at least three stages including an input stage having a plurality of input switching nodes each having at least one input, an intermediate stage having a plurality of intermediate switching nodes, and an output stage having a plurality of output switching nodes each having at least one output;

each node of each of the stages is controlled by its own control memory of the at least one control memory corresponding to the stage that includes said each node;

the first means comprise fifth means for examining contents of the control memory of the input node having the first input to determine if the first input is already connected to an individual intermediate node;

sixth means for examining contents of the control memory of the individual intermediate node to determine whether the first input is already connected through the individual intermediate node to the output node having the first output;

the second means comprise seventh means responsive to at least one of (a) a determination that the first input is already connected to the individual intermediate node and (b) a determination that the first input is not already connected through the individual intermediate node to the output node having the first output, for examining contents of the control memory of the individual intermediate node to determine whether the first input can be connected through the individual intermediate node to the output node having the first output;

the third means comprise eighth means responsive to a determination that the first input is not already but can be connected through the individual intermediate node to the output node having the first output, for modifying contents of the control memory of the individual intermediate node to connect the first input through the individual intermediate node to the output node having the first output; and the forth means comprise ninth means responsive to a determination that the first input is not already but can be connected through the individual intermediate node to the output node having the first output or a determination that the first input is already connected through the individual intermediate node to the output node having the first output, for modifying contents of the control memory of the output node having the first output to connect the first input to the first output.

29. The switching system of claim 28 further comprising:

tenth means responsive to one of (a) the request and (b) a determination that the first input is not already connected to an individual intermediate node, for examining contents of the control memories of the input node having the first input and of at least one of the intermediate nodes to determine if the first input can be connected from the input node having the first input through one of the at least one of the intermediate nodes to the output node having the first output; and eleventh means responsive to a determination that the first input is not already connected to the individual intermediate node but can be connected from the input node having the first input through one of the at least one of the intermediate nodes to the output node having the first output, for modifying contents of the control memories of the input node having the first input and the one intermediate node to connect the first input to the one intermediate node and through the one intermediate node to the output node having the first output; and wherein the ninth means are further responsive to a determination that the first input is not already connected to the individual intermediate node but can be connected from the input node having the first input through one of the at least one of the intermediate nodes to the output node having the first output, for modifying contents of the control memory of the output node having the first output to connect the first input to the first output.

30. The switching system of claim 24 wherein:

the plurality of switching stages are time-division multiplexed switching stages comprising an input stage including a plurality of input switching nodes each for receiving repeating input frames of a plurality of input time slots, an intermediate stage coupled to the input stage and including a plurality of intermediate switching nodes, and an output stage coupled to the intermediate stage and including a plurality of output switching nodes each for transmitting repeating output frames of a plurality of output time slots, each node being controlled by its own control memory;

the first means comprise fifth means responsive to a request to connect a first input time slot of input frames received by a first input node to a first output time slot of output frames transmitted by a first output node, for examining contents of the control memory of the first input node to determine if the first input time slot is already connected to an individual intermediate node, and sixth means for examining contents of the control memory of the individual intermediate node to determine whether the first input time slot is already connected to the first output node;

the second means comprise seventh means responsive to at least one of (a) a determination that the first input time slot is already connected to the individual intermediate node and (b) a determination that the first input time slot is not already connected to the first output node, for examining contents of the control memory of the individual intermediate node to determine whether the first input time slot can be connected to the first output node;

the third means comprise eighth means responsive to a determination that the first input time slot is not already but can be connected to the first output node, for modifying contents of the control memory of the individual intermediate node to connect the first input time slot to the first output node; and the fourth means comprise ninth means responsive to a determination that the first input time slot is not already but can be connected to the first output node or a determination that the first input time slot is already connected to the first output node, for modifying contents of the control memory of the first output node to connect the first input time slot to the first output time slot.

31. The switching system of claim 30 further comprising:

tenth means responsive to one of (a) the request and (b) a determination that the first input time slot is not already connected to an individual intermediate node, for examining contents of the control memories of the first input node and of at least one intermediate node to determine if the first input time slot can be connected through one of the at least one of the intermediate nodes to the first output node; and eleventh means responsive to a determination that the first input time slot is not already but can be connected through one of the at least one of the intermediate nodes to the first output node, for modifying contents of the control memory of the first input node to connect the first input time slot from the first input node to the one intermediate node; wherein the eighth means are further responsive to a determination that the first input time slot is not already but can be connected through one of the at least one of the intermediate nodes to the first output node, for modifying contents of the control memory of the one intermediate node to connect the first input time slot from the one intermediate node to the first output node; and the ninth means are further responsive to a determination that the first input time slot is not already but can be connected through one of the at least one of the intermediate nodes to the first output node, for modifying contents of the control memory of the first output node to connect the first input time slot to the first output time slot.

32. The switching system of claim 24 wherein:
the first and second means each comprise
means for monitoring control memory contents being read out for the purpose of controlling the control memory's corresponding stage, thereby to examine the contents of the monitored control memory.

33. The switching system of claim 24 wherein:
the first and second means each comprise apparatus dedicated to performing the examining.

34. The switching system of claim 24 wherein:
the first means comprise
hardware dedicated to examining the control memory contents; and
the second means comprise
hardware dedicated to examining the control memory contents in parallel with the hardware of the first means examining control memory contents.

35. The switching system of claim 30 wherein:
the fifth, sixth, and seventh means each comprise
means for monitoring control memory contents being read out for the purpose of controlling the control memory's corresponding node, thereby to examine the contents of the monitored control memory.

36. The switching system of claim 35 wherein:
the monitoring means of each of the fifth, sixth, and seventh means comprise apparatus dedicated to perforating the monitoring.

37. The switching system of claim 33 wherein:
the monitoring means of each of the fifth, sixth, and seventh means comprise
hardware dedicated to monitoring the control memory contents in parallel with the monitoring of control memory contents by the dedicated monitoring hardware of the other means.

38. A switching system comprising:
a plurality of switching stages including an input stage having a plurality of inputs and an output stage having a plurality of outputs;
a plurality of counters each having a count representing instances of present use of a different connection to the output stage;
first means responsive to a request to connect a first input to a first output, for determining whether the first input is already connected to the output stage;
second means responsive to one of (a) the request and (b) a determination that the first input is not already connected to the output stage, for determining whether the first input can be connected to the output stage;
third means responsive to a determination that the first input is not already but can be connected to the output stage, for connecting the first input to the output stage;
fourth means responsive to a determination that the first input is already connected to the output stage or a determination that the first input is not already but can be connected to the output stage, for connecting the first input to the first output at the output stage;
fifth means responsive to a determination that the first input is already connected to the output stage or a determination that the first input is not already but can be connected to the output stage, for updating the count that represents instances of present use of the connection of the first input to the output stage;
sixth means responsive to a request to disconnect the first input from the first output, for disconnecting the first input from the first output at the output stage;
seventh means responsive to the disconnection request, for updating the count that represents instances of present use of the connection of the first input to the output stage; and
eighth means responsive to the count updated by the seventh means representing no instances of present use of the connection of the first input to the output stage, for breaking the connection of the first input to the output stage, and further responsive to the count updated by the seventh means representing at least one instance of present use of the connection of the first input to the output stage, for not breaking the connection of the first input to the output stage.

39. A switching system comprising:
at least three switching stages including an input stage having a plurality of inputs, an output stage having a plurality of outputs, and an intermediate stage coupled between the input stage and the output stage;
a plurality of first counters each having a count representing instances of present use of a different connection from the intermediate stage to the output stage;
a plurality of second counters each having a count representing instances of present use of a different connection from the input stage to the intermediate stage;
first means responsive to a request to connect a first input to a first output, for determining if the first input is already connected from the input stage to the intermediate stage;
second means responsive to the request, for determining if the first input is already connected from the intermediate stage to the output stage;
third means responsive to at least one of (a) a determination that the first input is already connected from the input stage to the intermediate stage and (b) a determination that the first input is not already connected from the intermediate stage to the output stage, for determining whether the first input can be connected from the intermediate stage to the output stage;
fourth means responsive to a determination that the first input is not already but can be connected from the intermediate stage to the output stage, for connecting the first input from the intermediate stage to the output stage;
fifth means responsive to a determination that the first input is already connected from the intermediate stage to the output stage or the determination that the first input is not already but can be connected from the intermediate stage to the output stage, for connecting the first input to the first output at the output stage;

sixth means responsive to the determination that the first input is already connected from the intermediate stage to the output stage or the determination that the first input is not already but can be connected from the intermediate stage to the output stage, for updating a first count that represents instances of present use of the connection of the first input from the intermediate stage to the output stage;

seventh means responsive to the determination that the first input is not already but can be connected from the intermediate stage to the output stage, for updating a second count that represents instances of present use of the connection of the first input from the input stage to the intermediate stage;

eighth means responsive to a request to disconnect the first input from the first output, for disconnecting the first input from the first output at the output stage;

ninth means responsive to the request to disconnect the first input from the first output, for updating the first count that represents instances of present use of the connection of the first input from the intermediate stage to the output stage;

tenth means responsive to the first count updated by the ninth means representing no instances of present use of the connection of the first input from the intermediate stage to the output stage, for breaking the connection of the first input from the intermediate stage to the output stage, and further responsive to the first count updated by the ninth means representing at least one instance of present use of the connection of the first input from the intermediate stage to the output stage, for not breaking the connection of the first input from the intermediate stage to the output stage;

eleventh means responsive to the breaking of the connection from the intermediate stage to the output stage, for updating the second count that represents instances of present use of the connection of the first input from the input stage to the intermediate stage; and twelfth means responsive to the second count updated by the eleventh means representing no instances of present use of the connection of the first input from the input stage to the intermediate stage, for breaking the connection of the first input from the input stage to the intermediate stage, and further responsive to the second count updated by the eleventh means representing at least one instance of present use of the connection of the first input from the input stage to the intermediate stage, for not breaking the connection of the first input from the input stage to the intermediate stage.

40. The switching system of claim 39 wherein:

the input stage has a plurality of input switching nodes each having at least one input;

the output stage has a plurality of output switching nodes each having at least one output;

each first counter has a count that represents instances of present use of a single connection from the intermediate stage to a single output node; and each second counter has a count that represents instances of present use of a single connection from a single input node to the intermediate stage.

41. The switching system of claim 39 wherein:

the input stage is a time-division multiplexed switching stage including a plurality of input switching nodes each for receiving repeating input frames of a plurality of input time slots;

the intermediate stage is a time-division multiplexed switching stage coupled to the input stage and includes a plurality of intermediate switching nodes;

the output stage is a time-division multiplexed switching stage coupled to the intermediate stage and includes a plurality of output switching nodes each for transmitting repeating output frames of a plurality of output time slots;

the plurality of first counters each have a first count representing instances of present use of a different time slot between the intermediate nodes and the output nodes;

the plurality of second counters each have a second count representing instances of present use of a different time slot between the input nodes and the intermediate nodes;

the first means comprise means responsive to a request to connect a first input time slot of input frames received by a first input node to a first output time slot of output frames transmitted by a first output node, for determining if the first input time slot is already connected from the first input node to an individual intermediate node;

the second means comprise means for determining whether the first input time slot is already connected from the individual intermediate node to the first output node;

the third means comprise means responsive to at least one of (a) a determination that the first input time slot is already connected from the first input node to the individual intermediate node and (b) a determination that the first input time slot is not already connected from the individual intermediate node to the first output node, for determining whether the first input time slot can be connected from the individual intermediate node to the first output node;

the fourth means comprise means responsive to a determination that the first input time slot is not already but can be connected from the individual intermediate node to the first output node, for connecting the first input time slot from the individual intermediate node to the first output node;

the fifth means comprise means responsive to a determination that the first input time slot is already connected from the individual intermediate node to the first output node or a determination that the first input time slot is not already but can be connected from the individual intermediate node to the first output node, for connecting the first input time slot to the first output at the first output node;

the sixth means comprise means responsive to the determination that the first input time slot is already connected from the individual intermediate node to the first output node or the determination that the first input time slot is not already but can be connected from the individual intermediate node to the first output node, for updating a first count that represents instances of present use of a time slot connecting the first input time slot from the individual intermediate node to the first output node;

the seventh means comprise means responsive to the determination that the first input time slot is not already but can be connected from the individual intermediate node to the first output node, for updating a second count that represents instances of present use of a time slot connecting the first input time slot from the first input node to the individual intermediate node;

the eight means comprise means responsive to a request to disconnect the first input time slot from the first output time slot, for disconnecting the first input time slot from the first output time slot at the first output node;

the ninth means comprise means responsive to the request to disconnect the first input time slot from the first output time slot, for updating the first count that represents instances of present use of the time slot connecting the first input time slot from the individual intermediate node to the first output node;

the tenth means comprise means responsive to the first count updated by the ninth means representing no instances of present use of the time slot connecting the first input time slot from the individual intermediate node to the first output node, for breaking the connection of the first input time slot from the individual intermediate node to the first output node, and further responsive to the first count updated by the ninth means representing at least one instance of present use of the time slot connecting the first input time slot from the individual intermediate node to the first output node, for not breaking the connection of the first input time slot from the individual intermediate node to the first output node;

the eleventh means comprise means responsive to the breaking of the connection of the first input time slot from the individual intermediate node to the first output node, for updating the second count that represents instances of present use of the time slot connecting the first input time slot from the first input node to the individual intermediate node; and the twelfth means comprise means responsive to the second count updated by the eleventh means representing no instances of present use of the time slot connecting the first input time slot from the first input node to the individual intermediate node, for breaking the connection of the first input time slot from the first input node to the individual intermediate node, and further responsive to the second count updated by the eleventh means representing at least one instance of present use of the time slot connecting the first input time slot from the first input node to the individual intermediate node, for not breaking the connection of the first input time slot from the first input node to the individual intermediate node.

42. In a switching system having a plurality of switching stages including an input stage having a plurality of inputs and an output stage having a plurality of outputs, each stage having a corresponding at least one control memory for controlling connection establishment by said stage, the improvement comprising:

first means and second means responsive to a request to connect a first input to a first output, each for monitoring control words being read out of the corresponding at least one control memory of one stage for a purpose of causing the one stage to establish connections defined by the control words read out of the corresponding at least one control memory of the one stage in parallel with the other of the first and the second means monitoring control words being read out of the corresponding at least one control memory of a different stage for a purpose of causing the different stage to establish connections defined by the control words read out of the corresponding at least one control memory of the different stage; and third means coupled to the first and the second means for determining from the monitoring performed by the first and the second means whether the first input can be connected to the first output either as a branch of an existing connection or as a new connection.

43. The improvement of claim 42 in a switching system wherein control memories are read out cyclically for the purpose of controlling corresponding stages and wherein:

the determining means determine whether the first input can be connected to the first output either as a branch of an existing connection or as a new connection, during a single cycle of reading out of the control memories monitored by the first and the second means.

44. The improvement of claim 42 in a switching system having at least three switching stages including an intermediate stage coupled between the input stage and the output stage, wherein:

the first means monitor control words being read out of the corresponding at least one control memory for a purpose of controlling interconnection between the input stage and the intermediate stage, to determine whether the first input is or can be connected from the input stage to the intermediate stage;

the second means monitor control words being read out of the corresponding at least one control memory for a purpose of controlling interconnection between the intermediate stage and the output stage, to determine whether the first input is or can be connected from the intermediate stage to the output stage; and the determining means include means responsive to determinations made by the first and the second means, for determining whether the first input can be connected to the first output either as a twin to an existing connection, or as a sibling to an existing connection, or as a new connection.

45. The improvement of claim 44 in a switching system wherein control memories are read out cyclically for the purpose of controlling corresponding stages, and wherein:

the determining means determine whether the first input can be connected to the first output either as a twin to an existing connection, or as a sibling to an existing connection, or as a new connection, during a single cycle of reading out of the control memories monitored by the first and the second means.

46. The improvement of claim 42 in a switching system having at least three switching stages including an intermediate stage coupled between the input stage and the output stage, the input stage including a plurality of input switching nodes each having at least one input and the output stage having output switching nodes each having at least one output, wherein:

the first means monitor control words being read out of the corresponding at least one control memory for a purpose of controlling interconnection between the input node having the first input and the intermediate stage, to determine whether the first input is or can be connected from the input node having the first input to the intermediate stage;

the second means monitor control words being read out of the corresponding at least one control memory for a purpose of controlling the interconnection between the intermediate stage and the output node having the first output, to determine whether the first input is or can be connected from the intermediate stage to the output node having the first output; and the determining means include
means responsive to determinations made by the first and the second means, for determining whether the first input can be connected to the first output either as a twin to an existing connection, or as a sibling to an existing connection, or as a new connection.

47. The improvement of claim 46 wherein:
the first means include
hardware means for selecting a first control memory that controls interconnection between the input node having the first input and the intermediate stage from among a plurality of first control memories each one of which controls interconnection between a different input node and the intermediate stage, and
means for monitoring control words being read out of the selected first control memory; and the second means include
hardware means for selecting a second control memory that controls interconnection between the intermediate stage and the output node having the first output from among a plurality of second control memories each one of which controls interconnection between the intermediate stage and a different output node, and
means for monitoring control words being read out of the selected second control memory.

48. The improvement of claim 46 wherein:
the first means include
a plurality of first hardware means each corresponding to a different first control memory of a plurality of first control memories each one of which controls interconnecting between a different input node and the intermediate stage, for monitoring control words being read out of the corresponding first control memory;

the second means include
a plurality of second hardware means each corresponding to a different second control memory of a plurality of second control memories each one of which controls interconnection between the intermediate stage and a different output node, for monitoring control words being read out of the corresponding first control memory; and the determining means comprise
means for selecting the one of the first hardware means corresponding to the first control memory which corresponds to the input node having the first input and the one of the second hardware means corresponding to the second control memory which corresponds to the output node having the first output, and
means for determining from the determination of the selected ones of the first and the second hardware means whether the first input can be connected to the first output either as a twin to an existing connection, or as a sibling to an existing connection, or as a new connection.

49. The improvement of claim 42 in a time-division multiplexed switching system comprising an input stage including a plurality of input switching nodes each for receiving repeating input frames of a plurality of input time slots, an intermediate stage coupled to the input stage and including a plurality of intermediate switching nodes, and an output stage coupled to the intermediate stage and including a plurality of output switching nodes each for transmitting repeating output frames of a plurality of output time slots, each node being controlled by its own control memory of the at least one control memory corresponding to the stage that includes said each node, wherein:

the first means comprise
first hardware logic means responsive to a request to connect a first input time slot of input frames received by a first input node to a first output time slot of output frames transmitted by a first output node, for monitoring control words being read out of the control memory of the first input node for the purpose of controlling the first input node, to determine in parallel whether the first time slot is or can be connected from the first input node to an individual intermediate node;

the second means comprise
second hardware logic means responsive to the request, for monitoring control words being read out of the control memory of the individual intermediate node, to determine in parallel whether the first time slot is or can be connected from the individual intermediate node to the first output node; and the determining means are responsive to the determinations made by the first and the second hardware logic means, for determining whether the first input time slot can be connected to the first output time slot either as a twin to an existing connection, or as a sibling to an existing connection, or as a new connection.

50. The improvement of claim 49 wherein:
the first hardware logic means comprise
comparator means for determining whether a control word being read out of the control memory of the first input node identifies the first input time slot, and
idle detect means for determining whether the control word being read out of the control memory of the first input node does not identify an input time slot;

the second hardware logic means comprise
comparator means for determining whether a control word being read out of the control memory of the individual intermediate node identifies the first input node, and idle detect means for determining whether the control word being read out of the control memory of the individual intermediate node does not identify an input node; and the determining means comprise logical AND means responsive to both (a) a determination by the comparator means of the first hardware logic means that a control word identifies the first input time slot and (b) a simultaneous determination by the comparator means of the second hardware logic means that a control word identifies the first input node, for indicating that the first input time slot can be connected to the first output time slot as a twin to an existing connection, logical AND means responsive to both (a) a determination by the comparator means of the first hardware logic means that a control word identifies the first input time slot and (b) a simultaneous determination by the idle detect means of the second hardware logic means that a control word does not identify an input node, for indicating that the first input time slot can be connected to the first output time slot as a sibling to an existing connection, and logical AND means responsive to both (a) a determination by the idle detect means of the first hardware logic means that a control word does not identify an input time slot and (b) a simultaneous determination by the idle detect means of the second hardware logic means that a control word does not identify an input node, for indicating that the first input time slot can be connected to the first output time slot as a new connection.

51. In a time-division multiplexed switching system comprising an input stage including a plurality of input switching nodes each for receiving repeating input frames of a plurality of input time slots and for transmitting repeating first internal frames of a plurality of first internal time slots, and intermediate stage coupled to the input stage for receiving the first internal frames and transmitting repeating second internal frames of a plurality of second internal time slots, an output stage coupled to the intermediate stage and including a plurality of output switching nodes for receiving the second internal frames and each for transmitting repeating output frames of a plurality of output time slots, a plurality of first control memories each for controlling connections between input time slots and first internal time slots of first internal frames transmitted by an input node corresponding to the first control memory, and a plurality of second control memories each for controlling connections between first internal time slots and second internal time slots of second internal frames received by an output node corresponding to the second control memory, the improvement comprising:

first means responsive to a request to connect a first input time slot of input frames received by a first input node to a first output time slot of output frames transmitted by a first output node, for monitoring control words that are being read out of a first control memory corresponding to the first input node for a purpose of controlling connections between input time slots and first internal time slots, to determine in parallel (a) whether the first input time slot is already connected to a first internal time slot and (b) whether the first input time slot can be connected to a first internal time slot;

second means responsive to the request and operative in parallel with the second means, for monitoring control words that are being read out of a second control memory corresponding to the first output node for a purpose of controlling connections between first internal time slots and second internal time slots, to determine in parallel (a) whether a first internal time slot, if any, that is connected to the first input time slot is already connected to a second internal time slot and (b) whether a first internal time slot, if any, that can be connected to the first input time slot also can be connected to a second internal time slot;

third means responsive to a determination that the first input time slot is already connected to a first internal time slot and that the first internal time slot that is connected to the first input time slot is already connected to a second internal time slot, for indicating that the requested connection can be established as a twin to an existing connection by connecting the first output time slot to the second internal time slot that is connected to the first internal time slot that is connected to the first input time slot;

fourth means responsive to a determination that the first input time slot is already connected to a first internal time slot and that a first internal time slot that can be connected to the first input time slot also can be connected to a second internal time slot, for indicating that the requested connection can be established as a sibling to an existing connection by connecting an individual second internal time slot to the first internal time slot that is connected to the first input time slot and by connecting the first output time slot to the individual second internal time slot; and fifth means responsive to a determination that the first input time slot can be connected to a first internal time slot and that a first internal time slot that can be connected to the first input time slot also can be connected to a second internal time slot, for indicating that the requested connection can be established as a new connection between the first input time slot and the first output node.

52. In a switching system having at least three switching stages including an input stage having a plurality of inputs, an output stage having a plurality of outputs, and an intermediate stage coupled between the input stage and the output stage, each stage having a corresponding at least one control memory for controlling said stage, a path-hunt method comprising the steps of:

cyclically reading control words out of the corresponding at least one control memory of the one stage for a purpose of controlling interconnection between the intermediate stage and the output stage;

cyclically reading control words out of the corresponding at least one memory of another stage for a purpose of controlling interconnection between the input stage and the intermediate stage;

in response to a request to connect a first input to a first output, monitoring the control words being read out of the corresponding at least one control memory of the one stage during a single cycle of reading out of said at least one control memory of the one stage, to determine whether the first input is or can be connected from the intermediate stage to the output stage, and monitoring, in parallel with the monitoring of the control words being read out of the corresponding at least one control memory of the one stage, the control words being read out of the corresponding at least one control memory of the other stage during a single cycle of reading out of said at least one control memory of the other stage, to determine whether the first input is or can be connected from the input stage to the intermediate stage; and in response to determinations made by the steps of monitoring, determining whether the first input can be connected to the first output either as a twin to an existing connection, or as a sibling to an existing connection, or as a new connection.

53. In a switching system having at least three switching stages including an input stage having a plurality of inputs, an output stage having a plurality of outputs, and an intermediate stage coupled between the input stage and the output stage, each stage having a corresponding at least one control memory for controlling said stage, the improvement comprising:

first means and second means responsive to a request to connect a first input to a first output, each for monitoring control words being read out of the corresponding at least one control memory of one stage for a purpose of controlling the one stage in parallel with the other of the first and the second means monitoring control words being read out of the corresponding at least one control memory of a different stage for a purpose of controlling the different stage, wherein the first means monitor control words being read out of the corresponding at least one control memory for a purpose of controlling interconnection between the input stage and the intermediate stage, to determine whether the first input is or can be connected from the input stage to the intermediate stage, and the second means monitor control words being read out of the corresponding at least one control memory for a purpose of controlling interconnection between the intermediate stage and the output stage, to determine whether the first input is or can be connected from the intermediate stage to the output stage; and third means coupled to the first means and to the second means and responsive to determinations made by the first and the second means, for determining whether the first input can be connected to the first output either as a twin to an existing connection, or as a sibling to an existing connection, or as a new connection.

54. The improvement of claim 53 in a switching system wherein control memories are read out cyclically for the purpose of controlling corresponding stages, and wherein:

the determining means determine whether the first input can be connected to the first output either as a twin to an existing connection, or as a sibling to an existing connection, or as a new connection, during a single cycle of reading out of the control memories monitored by the first and the second means.

55. In a switching system having at least three switching stages including an input stage having a plurality of inputs, an output stage having a plurality of outputs, and an intermediate stage coupled between the input stage and the output stage, each stage having a corresponding at least one control memory for controlling said stage, the input stage including a plurality of input switching nodes each having at least one input and the output stage having output switching nodes each having at least one output, the improvement comprising:

first means and second means responsive to a request to connect a first input to a first output, each for monitoring control words being read out of the corresponding at least one control memory of one stage for a purpose of controlling the one stage in parallel with the other of the first and the second means monitoring control words being read out of the corresponding at least one control memory of a different stage for a purpose of controlling the different stage, wherein the first means monitor control words being read out of the corresponding at least one control memory for a purpose of controlling interconnection between the input node having the first input and the intermediate stage, to determine whether the first input is or can be connected from the input node having the first input to the intermediate stage, and the second means monitor control words being read out of the corresponding at least one control memory for a purpose of controlling the interconnection between the intermediate stage and the output node having the first output, to determine whether the first input is or can be connected from the intermediate stage to the output node having the first output; and third means coupled to the first means and to the second means and responsive to determinations made by the first and the second means, for determining whether the first input can be connected to the first output either as a twin to an existing connection, or as a sibling to an existing connection, or as a new connection.

56. The improvement of claim 55 wherein:

the first means include hardware means for selecting a first control memory that controls interconnection between the input node having the first input and the intermediate stage from among a plurality of first control memories each one of which controls interconnection between a different input node and the intermediate stage, and means for monitoring control words being read out of the selected first control memory; and the second means include hardware means for selecting a second control memory that controls interconnection between the intermediate stage and the output node having the first output from among a plurality of second control memories each one of which controls interconnection between the intermediate stage and a different output node, and means for monitoring control words being read out of the selected second control memory.

57. The improvement of claim 55 wherein:

the first means include a plurality of first hardware means each corresponding to a different first control memory of a plurality of first control memories each one of which controls interconnecting between a different input node and the intermediate stage, for monitoring control words being read out of the corresponding first control memory;

the second means include a plurality of second hardware means each corresponding to a different second control memory of a plurality of second control memories each one of which controls interconnection between the intermediate stage and a different output node, for monitoring control words being read out of the corresponding first control memory; and the determining means comprise means for selecting the one of the first hardware means corresponding to the first control memory which corresponds to the input node having the first input and the one of the second hardware means corresponding to the second control memory which corresponds to the output node having the first output, and means for determining from the determination of the selected ones of the first and the second hardware means whether the first input can be connected to the first output either as a twin to an existing connection, or as a sibling to an existing connection, or as a new connection.

58. In a time-division multiplexed switching system comprising an input stage including a plurality of input switching nodes each having inputs for receiving repeating input frames of a plurality of input time slots, an intermediate stage coupled to the input stage and including a plurality of intermediate switching nodes, and an output stage coupled to the intermediate stage and including a plurality of output switching nodes each having outputs for transmitting repeating output frames of a plurality of output time slots, each node being controlled by its own control memory, the improvement comprising:

first hardware logic means responsive to a request to connect a first input time slot of input frames received by an input of a first input node to a first output time slot of output frames transmitted by an output of a first output node, for monitoring control words being read out of the control memory of the first input node for the purpose of controlling the first input node, to determine in parallel whether the first time slot is or can be connected from the first input node to an individual intermediate node;

second hardware logic means responsive to the request, for monitoring control words being read out of the control memory of the individual intermediate node in parallel with the first hardware logic means monitoring control words being read out of the control memory of the first input node, to determine in parallel whether the first time slot is or can be connected from the individual intermediate node to the first output node; and third means coupled to the first hardware logic means and to the second hardware logic means and responsive to the determinations made by the first hardware logic means and the second hardware logic means, for determining whether the first input time slot can be connected to the first output time slot either as a twin to an existing connection, or as a sibling to an existing connection, or as a new connection.

59. The improvement of claim 58 wherein:

the first hardware logic means comprise comparator means for determining whether a control word being read out of the control memory of the first input node identifies the first input time slot, and idle detect means for determining whether the control word being read out of the control memory of the first input node does not identify an input time slot;

the second hardware logic means comprise comparator means for determining whether a control word being read out of the control memory of the individual intermediate node identifies the first input node, and idle detect means for determining whether the control word being read out of the control memory of the individual intermediate node does not identify an input node; and the determining means comprise logical AND means responsive to both (a) a determination by the comparator means of the first hardware logic means that a control word identifies the first input time slot and (b) a simultaneous determination by the comparator means of the second hardware logic means that a control word identifies the first input node, for indicating that the first input time slot can be connected to the first output time slot as a twin to an existing connection, logical AND means responsive to both (a) a determination by the comparator means of the first hardware logic means that a control word identifies the first input time slot and (b) a simultaneous determination by the idle detect means of the second hardware logic means that a control word does not identify an input node, for indicating that the first input time slot can be connected to the first output time slot as a sibling to an existing connection, and logical AND means responsive to both (a) a determination by the idle detect means of the first hardware logic means that a control word does not identify an input time slot and (b) a simultaneous determination by the idle detect means of the second hardware logic means that a control word does not identify an input node, for indicating that the first input time slot can be connected to the first output time slot as a new connection.

60. In a switching system having a plurality of switching stages including an input stage having a plurality of inputs and an output stage having a plurality of outputs, each stage having a corresponding at least one control memory for controlling said stage, a path-hunt method comprising the steps of:

(A) in response to a request to connect a call from a first input to a first output, examining contents of the corresponding at least one control memory of at least one of the switching stages to determine if the call is already connected from the first input to the output stage;

(B) in response to a determination that the call is already connected from the first input to the output stage, modifying contents of the corresponding at least one control memory of the output stage to branch out the call at the output stage to the first output;

(C) in response to one of (a) the request and (b) a determination that the call is not already connected from the first input to the output stage, examining contents of the corresponding at least one control memory of at least one of the switching stages to determine if the call can be connected from the first input to the output stage; and (D) in response to a determination that the call is not already but can be connected from the first input to the output stage, (i) modifying contents of the corresponding at least one control memory of at least one of the switching stages to connect the call from the first input to the output stage, and (ii) modifying contents of the corresponding at least one control memory of the output stage to connect the call at the output stage to the first output.

61. The method of claim 60 in a switching system wherein the output stage includes a plurality of switching nodes each having at least one output and each node is controlled by its own control memory of the at least one control memory corresponding to the output stage, wherein:

step (A) is performed to determine if the call is already connected from the first input to the output stage node having the first output;

step (B) comprises the step of in response to a determination that the call is already connected from the first input to the output stage node having the first output, modifying contents of the control memory of the output stage node having the first output to branch out the call at the output stage to the first output;

step (C) is performed in response to one of (a) the request and (b) a determination that the call is not already connected from the first input to the output stage node having the first output, to determine if the call can be connected from the first input to the output stage node having the first output;

step (D) is performed in response to a determination that the call is not already but can be connected from the first input to the output stage node having the first output, step (D)(i) is performed to connect the call from the first input to the output stage node having the first output; and step (D)(ii) comprises the step of modifying contents of the control memory of the output stage node having the first output to connect the call at the output stage node having the first output to the first output.

62. The method of claim 60 in a switching system having at least three switching stages including an intermediate stage coupled between the input stage and the output stage, wherein:

step (A) comprises the steps of examining contents of the corresponding at least one control memory of the input stage to determine if the call is already connected from the first input to the intermediate stage, and examining contents of the corresponding at least one control memory of the intermediate stage to determine if the call is already connected from the intermediate stage to the output stage;

step (C) comprises the step of examining contents of the corresponding at least one control memory of the intermediate stage to determine if the call can be connected from the intermediate stage to the output stage;

step (D)(i) comprises the step of modifying contents of the corresponding at least one control memory of the intermediate stage to connect the call from the intermediate stage to the output stage, thereby branching at the intermediate stage any said call that is determined to be already connected from the first input to the intermediate stage.

63. The method of claim 62 comprising the further steps of:

in response to one of (a) the request and (b) a determination that the call is not already connected from the first input to the intermediate stage, examining contents of the corresponding at least one control memory of the intermediate stage and of the corresponding at least one control memory of the input stage to determine if the call can be connected from the input stage through the intermediate stage to the output stage; and in response to a determination that the call is not already connected from the first input to the intermediate stage but can be connected from the input stage through the intermediate stage to the output stage, (i) modifying contents of the corresponding at least one control memory of the input stage to connect the call from the first input to the intermediate stage, (ii) modifying contents of the corresponding at least one control memory of the intermediate stage to connect the call from the intermediate stage to the output stage, and (iii) modifying contents of the corresponding at least one control memory of the output stage to connect the call at the output stage to the first output.

64. The method of claim 60 in a switching system having at least three stages including an input stage having a plurality of input switching nodes each having at least one input and controlled by its own control memory of the at least one control memory corresponding to the input stage, an intermediate stage having a plurality of intermediate switching nodes each controlled by its own control memory of the at least one control memory corresponding to the intermediate stage, and an output stage having a plurality of output switching nodes each having at least one output and controlled by its own control memory of the at least one control memory corresponding to the output stage, wherein:

step (A) comprises the steps of examining contents of the control memory of the input node having the first input to determine if the call is already connected from the first input to an individual intermediate node;

examining contents of the control memory of the individual intermediate node to determine whether the call is already connected through the individual intermediate node to the output node having the first output;

step (B) comprises the step of in response to a determination that the call is already connected through the individual intermediate node to the output node having the first output, modifying contents of the control memory of the output node having the first output to branch out the call at the output node having the first output to the first output;

step (C) comprises the step of in response to at least one of (a) a determination that the call is already connected from the first input to the individual intermediate node and (b) a determination that the call is not already connected through the individual intermediate node to the output node having the first output, examining contents of the control memory of the individual intermediate node to determine whether the call can be connected through the individual intermediate node to the output node having the first output;

step (D)(i) comprises the step of in response to a determination that the call is not already but can be connected through the individual intermediate node to the output node having the first output, modifying contents of the control memory of the individual intermediate node to connect the call through the individual intermediate node to the output node having the first output; and step (D)(ii) comprises the step of modifying contents of the control memory of the output node having the first output to connect the call at the output node having the first output to the first output.

65. The method of claim 64 comprising the further steps of:

(E) in response to one of (a) the request and (b) a determination that the call is not already connected from he first input to an individual intermediate node, examining contents of the control memories of the input node having the first input and of at least one of the intermediate nodes to determine if the call can be connected from the input node having the first input through one of the at least one of the intermediate nodes to the output node having the first output;

(F) in response to a determination that the call is not already connected from the first input to the individual intermediate node but can be connected from the input node having the first input through one of the at least one of the intermediate nodes to the output node having the first output, (i) modifying contents of the control memories of the input node having the first input and the one intermediate node to connect the call from the first input to the one intermediate node and through the one intermediate node to the output node having the first output, and (ii) modifying contents of the control memory of the output node having the first output to connect the call at the output node having the first output to the first output.

66. The method of claim 60 in a time-division multiplexed switching system comprising an input stage including a plurality of input switching nodes each for receiving repeating input frames of a plurality of input time slots, an intermediate stage coupled to the input stage and including a plurality of intermediate switching nodes, and an output stage coupled to the intermediate stage and including a plurality of output switching nodes each for transmitting repeating output frames of a plurality of output time slots, each node being controlled by its own control memory of the at least one control memory corresponding to the stage which includes said each node, wherein:

step (A) comprises the steps of in response to a request to connect a call carried by a first input time slot of input frames received by a first input node to a first output time slot of output frames transmitted by a first output node, examining contents of the control memory of the first input node to determine if the first input time slot is already connected to an individual intermediate node, and examining contents of the control memory of the individual intermediate node to determine whether the first input time slot is already connected to the first second output node;

step (B) comprises the step of in response to a determination that the first input time slot is already connected to the first output node, modifying contents of the control memory of the first output node to connect the first input time slot to the first output time slot;

step (C) comprises the step of in response to at least one of (a) a determination that the first input time slot is already connected to the individual intermediate node and (b) a determination that the first input time slot is not already connected to the first output node, examining contents of the control memory of the individual intermediate node to determine whether the first input time slot can be connected to the first output node;

step (D)(i) comprises the step of in response to a determination that the first input time slot is not already but can be connected to the first output node, modifying contents of the control memory of the individual intermediate node to connect the first input time slot to the first output node; and step (D)(ii) comprises the step of modifying contents of the control memory of the first output node to connect the first input time slot to the first output time slot.

67. The method of claim 66 comprising the further steps of:

(E) in response to one of (a) the request and (b) a determination that the first input time slot is not already connected to an individual intermediate node, examining contents of the control memories of the first input node and of at least one intermediate node to determine if the first input time slot can be connected through one of the at least one of the intermediate nodes to the first output node;

(F) in response to a determination that the first input time slot is not already but can be connected through one of the at least one of the intermediate nodes to the first output node, (i) modifying contents of the control memories of the first input node and the one intermediate node to connect the first input time slot through the one intermediate node to the first output node, and (ii) modifying contents of the control memory of the first output node to connect the first input time slot to the first output time slot.

68. The method of claim 60 wherein:

every step of examining control memory contents comprises the step of monitoring control memory contents being read out for the purpose of controlling the control memory's corresponding stage.

69. The method of claim 60 wherein:

every step of examining control memory contents is performed by apparatus dedicated to performing the examining.

70. The method of claim 60 wherein:

all steps of examining control memory contents are performed in parallel by hardware dedicated to performing the examining.

71. The method of claim 66 wherein:

every step of examining control memory contents comprises the step of monitoring control memory contents being read out for the purpose of controlling the control memory's corresponding node.

72. The method of claim 71 wherein:

every step of monitoring is performed by apparatus dedicated to performing the monitoring.

73. The method of claim 71 wherein:

all steps of monitoring are performed in parallel by hardware dedicated to perforating the monitoring.

74. A switching system comprising:

a plurality of switching stages including an input stage having a plurality of inputs and an output stage having a plurality of outputs;

each stage having a corresponding at least one control memory for controlling said stage;

first means responsive to a request to connect a call from a first input to a first output, for examining contents of the corresponding at least one control memory of at least one of the switching stages to determine if the call is already connected from the first input to the output stage;

second means responsive to one of (a) the request and (b) a determination that the call is not already connected from the first input to the output stage, for examining contents of the corresponding at least one control memory of at least one of the switching stages to determine if the call can be connected from the first input to the output stage;

third means responsive to a determination that the call is not already but can be connected from the first input to the output stage, for modifying contents of the corresponding at least one control memory of at least one of the switching stages to connect the call from the first input to the output stage; and fourth means responsive to a determination that the call is not already but can be connected from the first input to the output stage or to a determination that the call is already connected from the first input to the output stage, for modifying contents of the corresponding at least one control memory of the output stage to connect the call at the output stage to the first output, thereby branching at the output stage any said call that is determined to be already connected from the first input to the output stage.

75. The switching system of claim 74 wherein:

the output stage includes a plurality of switching nodes each having at least one output;

each node is controlled by its own control memory of the at least one control memory corresponding to the output stage;

the first means examine control memory contents to determine if the call is already connected from the first input to the output stage node having the first output;

the second means comprise fifth means responsive to one of (a) the request and (b) a determination that the call is not already connected from the first input to the output stage node having the first output, for examining contents of the corresponding at least one control memory of the at least one of the switching stages to determine if the call can be connected from the first input to the output stage node having the first output;

the third means comprise sixth means responsive to a determination that the call is not already but can be connected from the first input to the output stage node having the first output, for modifying contents of the corresponding at least one control memory of the at least one of the switching stages to connect the call from the first input to the output stage node having the first output; and the fourth means comprise sixth means responsive to a determination that the call is not already but can be connected from the first input to the output stage node having the first output or to a determination that the call is already connected from the first input to the output stage node having the first output, for modifying contents of the control memory of the output stage node having the first output to connect the call at the output stage to the first output, thereby branching at the output stage node having the first output any said call that is determined to be already connected from the first input to the output stage node having the first output.

76. The switching system of claim 74 wherein:

the plurality of switching stages comprise at least three switching stages including an intermediate stage coupled between the input stage and the output stage;

the first means comprise fifth means for examining contents of the corresponding at least one control memory of the input stage to determine if the call is already connected from the first input to the intermediate stage, and sixth means for examining contents of the corresponding at least one control memory of the intermediate stage to determine if the call is already connected from the intermediate stage to the output stage;

the second means comprise seventh means for examining contents of the corresponding at least one control memory of the intermediate stage to determine if the call can be connected from the intermediate stage to the output stage; and the third means comprise eighth means for modifying contents of the corresponding at least one control memory of the intermediate stage to connect the call from the intermediate stage to the output stage, thereby branching at the intermediate stage any said call that is determined to be already connected from the first input to the intermediate stage.

77. The switching system of claim 76 further comprising:

ninth means responsive to one of (a) the request and (b) a determination that the call is not already connected from the first input to the intermediate stage, for examining contents of the corresponding at least one control memory of the intermediate stage and of the corresponding at least one control memory of the input stage to determine if the call can be connected from the input stage through the intermediate stage to the output stage; and tenth means responsive to a determination that the call is not already connected from the first input to the intermediate stage but can be connected from the input stage through the intermediate stage to the output stage, for modifying contents of the corresponding at least one control memory of the input stage to connect the call from the first input to the intermediate stage; wherein the eighth means are further responsive to the determination that the call is not already connected from the first input to the intermediate stage but can be connected from the input stage through the intermediate stage to the output stage, for modifying contents of the corresponding at least one control memory of the intermediate stage to connect the call from the intermediate stage to the output stage; and the fourth means are further responsive to the determination that the call is not already connected from the first input to the intermediate stage but can be connected from the input stage through the intermediate stage to the output stage, for modifying contents of the corresponding at least one control memory of the output stage to connect the call at the output stage to the first output.

78. The switching system of claim 74 wherein:

the plurality of switching stages comprise at least three stages including an input stage having a plurality of input switching nodes each having at least one input, an intermediate stage having a plurality of intermediate switching nodes, and an output stage having a plurality of output switching nodes each having at least one output;

each node of each of the stages is controlled by its own control memory of the at least one control memory corresponding to the stage that includes said each node;

the first means comprise fifth means for examining contents of the control memory of the input node having the first input to determine if the call is already connected from the first input to an individual intermediate node;

sixth means for examining contents of the control memory of the individual intermediate node to determine whether the call is already connected through the individual intermediate node to the output node having the first output;

the second means comprise seventh means responsive to at least one of (a) a determination that the call is already connected from the first input to the individual intermediate node and (b) a determination that the call is not already connected through the individual intermediate node to the output node having the first output, for examining contents of the control memory of the individual intermediate node to determine whether the call can be connected through the individual intermediate node to the output node having the first output;

the third means comprise eighth means responsive to a determination that the call is not already but can be connected through the individual intermediate node to the output node having the first output, for modifying contents of the control memory of the individual intermediate node to connect the call through the individual intermediate node to the output node having the first output; and the forth means comprise ninth means responsive to a determination that the call is not already but can be connected through the individual intermediate node to the output node having the first output or a determination that the call is already connected through the individual intermediate node to the output node having the first output, for modifying contents of the control memory of the output node having the first output to connect the call at the output node having the first output to the first output.

79. The switching system of claim 78 further comprising:

tenth means responsive to one of (a) the request and (b) a determination that the call is not already connected from the first input to an individual intermediate node, for examining contents of the control memories of the input node having the first input and of at least one of the intermediate nodes to determine if the call can be connected from the input node having the first input through one of the at least one of the intermediate nodes to the output node having the first output; and eleventh means responsive to a determination that the call is not already connected from the first input to the individual intermediate node but can be connected from the input node having the first input through one of the at least one of the intermediate nodes to the output node having the first output, for modifying contents of the control memories of the input node having the first input and the one intermediate node to connect the call from the first input to the one intermediate node and through the one intermediate node to the output node having the first output; and wherein the ninth means are further responsive to a determination that the call is not already connected from the first input to the individual intermediate node but can be connected from the input node having the first input through one of the at least one of the intermediate nodes to the output node having the first output, for modifying contents of the control memory of the output node having the first output to connect the call at the output node having the first output to the first output.

80. The switching system of claim 74 wherein:

the plurality of switching stages are time-division multiplexed switching stages comprising an input stage including a plurality of input switching nodes each for receiving repeating input frames of a plurality of input time slots, an intermediate stage coupled to the input stage and including a plurality of intermediate switching nodes, and an output stage coupled to the intermediate stage and including a plurality of output switching nodes each for transmitting repeating output frames of a plurality of output time slots, each node being controlled by its own control memory;

the first means comprise fifth means responsive to a request to connect a call carried by a first input time slot of input frames received by a first input node to a first output time slot of output frames transmitted by a first output node, for examining contents of the control memory of the first input node to determine if the first input time slot is already connected to an individual intermediate node, and sixth means for examining contents of the control memory of the individual intermediate node to determine whether the first input time slot is already connected to the first output node;

the second means comprise seventh means responsive to at least one of (a) a determination that the first input time slot is already connected to the individual intermediate node and (b) a determination that the first input time slot is not already connected to the first output node, for examining contents of the control memory of the individual intermediate node to determine whether the first input time slot can be connected to the first output node;

the third means comprise eighth means responsive to a determination that the first input time slot is not already but can be connected to the first output node, for modifying contents of the control memory of the individual intermediate node to connect the first input time slot to the first output node; and the fourth means comprise ninth means responsive to a determination that the first input time slot is not already but can be connected to the first output node or a determination that the first input time slot is already connected to the first output node, for modifying contents of the control memory of the first output node to connect the first input time slot to the first output time slot.

81. The switching system of claim 80 further comprising:

tenth means responsive to one of (a) the request and (b) a determination that the first input time slot is not already connected to an individual intermediate node, for examining contents of the control memories of the first input node and of at least one intermediate node to determine if the first input time slot can be connected through one of the at least one of the intermediate nodes to the first output node; and eleventh means responsive to a determination that the first input time slot is not already but can be connected through one of the at least one of the intermediate nodes to the first output node, for modifying contents of the control memory of the first input node to connect the first input time slot from the first input node to the one intermediate node; wherein the eighth means are further responsive to a determination that the first input time slot is not already but can be connected through one of the at least one of the intermediate nodes to the first output node, for modifying contents of the control memory of the one intermediate node to connect the first input time slot from the one intermediate node to the first output node; and the ninth means are further responsive to a determination that the first input time slot is not already but can be connected through one of the at least one of the intermediate nodes to the first output node, for modifying contents of the control memory of the first output node to connect the first input time slot to the first output time slot.

82. The switching system of claim 74 wherein:

the first and second means each comprise means for monitoring control memory contents being read out for the purpose of controlling the control memory's corresponding stage, thereby to examine the contents of the monitored control memory.

83. The switching system of claim 74 wherein:

the first and second means each comprise apparatus dedicated to performing the examining.

84. The switching system of claim 74 wherein:

the first means comprise hardware dedicated to examining the control memory contents; and the second means comprise hardware dedicated to examining the control memory contents in parallel with the hardware of the first means examining control memory contents.

85. The switching system of claim 80 wherein:

the fifth, sixth, and seventh means each comprise means for monitoring control memory contents being read out for the purpose of controlling the control memory's corresponding node, thereby to examine the contents of the monitored control memory.

86. The switching system of claim 85 wherein:

the monitoring means of each of the fifth, sixth, and seventh means comprise apparatus dedicated to performing the monitoring.

87. The switching system of claim 85 wherein:

the monitoring means of each of the fifth, sixth, and seventh means comprise hardware dedicated to monitoring the control memory contents in parallel with the monitoring of control memory contents by the dedicated monitoring hardware of the other means.

* * * * *